United States Patent
Chen et al.

(10) Patent No.: US 7,454,073 B2
(45) Date of Patent: Nov. 18, 2008

(54) VIDEO COMPRESSION USING MULTIPLE VARIABLE LENGTH CODING PROCESSES FOR MULTIPLE CLASSES OF TRANSFORM COEFFICIENT BLOCKS

(75) Inventors: Wen-hsiung Chen, Sunnyvale, CA (US); Fang Wu, Pleasanton, CA (US); Gregory D. Pelton, Raleigh, NC (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 871 days.

(21) Appl. No.: 10/910,712

(22) Filed: Aug. 3, 2004

(65) Prior Publication Data

US 2005/0276498 A1    Dec. 15, 2005

Related U.S. Application Data

(63) Continuation-in-part of application No. 10/898,654, filed on Jul. 22, 2004, which is a continuation-in-part of application No. 10/869,229, filed on Jun. 15, 2004.

(51) Int. Cl.
*G06K 9/36* (2006.01)
(52) U.S. Cl. .................................. 382/239; 382/245
(58) Field of Classification Search ................. 382/239, 382/245
See application file for complete search history.

(56) References Cited

U.S. PATENT DOCUMENTS

| | | | |
|---|---|---|---|
| 4,420,771 A * | 12/1983 | Pirsch .......................... 341/56 |
| 4,698,672 A | 10/1987 | Chen et al. ................... 358/136 |
| 4,706,265 A | 11/1987 | Furukawa ..................... 375/122 |
| 4,813,056 A | 3/1989 | Fedele .......................... 375/27 |
| 4,821,119 A | 4/1989 | Gharavi .................. 375/240.16 |
| 4,845,560 A | 7/1989 | Kondo et al. ................. 358/133 |
| 4,858,017 A | 8/1989 | Torbey ......................... 358/426 |
| 4,920,426 A | 4/1990 | Hatori et al. ................. 358/433 |
| 4,922,510 A | 5/1990 | Brusewitz .................... 375/122 |
| 4,937,573 A | 6/1990 | Silvio et al. ................... 341/67 |
| 4,985,700 A | 1/1991 | Mikami ........................ 341/59 |
| 4,985,766 A | 1/1991 | Morrison et al. ............ 358/133 |
| 5,006,930 A | 4/1991 | Stroppiana et al. .......... 358/133 |
| 5,045,938 A | 9/1991 | Sugiyama ................... 358/133 |

(Continued)

FOREIGN PATENT DOCUMENTS

| EP | 0 266 049 A2 | 5/1988 |
|---|---|---|
| WO | WO 93/18616 | 9/1993 |
| WO | WO 03/090421 | 10/2003 |

OTHER PUBLICATIONS

Golomb, S. "Run-Length Encodings." *IEEE Transactions on Information Theory*, vol. 12, No. 3, Jul. 1966, pp. 399-401.

(Continued)

*Primary Examiner*—Wenpeng Chen
(74) *Attorney, Agent, or Firm*—Dov Rosenfeld; Inventek

(57) ABSTRACT

A method and apparatus to variable length code an ordered series of quantized transform coefficients of an image block. The method classifies the series into one of a plurality of classes. Each class has a corresponding coding process that is applicable to the statistical distribution of the coefficients in the series. The series is coded according to the particular corresponding coding process of the class of the classifying.

95 Claims, 8 Drawing Sheets

U.S. PATENT DOCUMENTS

| | | | |
|---|---|---|---|
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 2004/0228540 A1 | 11/2004 | Chen et al. | 382/246 |

OTHER PUBLICATIONS

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California Micro project, available on http://www.ucop.edu/research/micro/97_98/97_193.pdf.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/.

K. Takagi, "Reversibility of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

\* cited by examiner

Table 1

| Run length | 1 | 2 | 3 | 4 | 5 | 6 | . |
|---|---|---|---|---|---|---|---|
| Code | c1 | c2 | C3 | c4 | c5 | c6 | . |

FIG. 7A

Table 2

| Run length | 1 | 2 | 3 | 4 | 5 | 6 | . |
|---|---|---|---|---|---|---|---|
| Code | c'1 | c'2 | C'3 | c'4 | c'5 | c'6 | . |

FIG. 7B

Table 3 /801

| Run length | 0 | 1 | 2 | 3 | 4 | 5 | . | . |
|---|---|---|---|---|---|---|---|---|
| Code | $c''0$ | $c''1$ | $c''2$ | $c''3$ | $c''4$ | $c''5$ | . | . |

FIG. 8

Table 4 /901

| Run length | 0 | 1 | 2 | 3 | 4 | 5 | . | Exc |
|---|---|---|---|---|---|---|---|---|
| Code | $c'''0$ | $c'''1$ | $c'''2$ | $c'''3$ | $c'''4$ | $c'''5$ | . | $ESC'''$ |

FIG. 9

VIDEO COMPRESSION USING MULTIPLE
VARIABLE LENGTH CODING PROCESSES
FOR MULTIPLE CLASSES OF TRANSFORM
COEFFICIENT BLOCKS

RELATED PATENT APPLICATIONS

This invention is a continuation-in-part of U.S. patent application Ser. No. 10/898,654 to inventors Chen et al., filed Jul. 22, 2004 and titled AN EXTENDED HYBRID VARIABLE LENGTH CODING METHOD FOR LOW BIT RATE VIDEO CODING, Attorney/Agent Ref. No. CISCO-8795. U.S. patent application Ser. No. 10/898,654 is in turn a continuation-in-part of U.S. patent application Ser. No. 10/869,229 to inventors Chen et al., filed Jun. 15, 2004 and titled A HYBRID VARIABLE LENGTH CODING METHOD FOR LOW BIT RATE VIDEO CODING, Attorney/Agent Ref. No. CISCO-8783.

U.S. patent application Ser. No. 10/869,229 is incorporated herein by reference, and the methods described therein are each and collectively called the "Basic Hybrid VLC Method" herein. U.S. patent application Ser. No. 10/898,654 is also incorporated herein by reference, and the methods described therein are each and collectively called the "Extended Hybrid VLC Method" herein.

BACKGROUND

The present invention related to image compression, and in particular to variable length coding of a series of quantized transform coefficients of a block of image data.

Digital video compression ranges from coding still video/image to coding moving video for photographic, broadcasting, streaming, and conferencing applications. Modern transform based techniques include dividing an image into blocks, transforming the blocks of image data into transform coefficients, quantizing the coefficients, ordering the coefficients along a path, e.g., a zig-zag path on the two-dimensional transform domain, and encoding the series of quantized coefficients using a variable length coding method.

Two-dimensional variable length coding (2D-VLC) includes collecting or assuming the statistics of two dimensional block transform coefficient events that are each a run of the most-likely-to-occur amplitude, e.g., 0, followed by another amplitude. The coding includes assigning variable length codes, e.g., optimal codes such as Huffman codes or Arithmetic codes, to each event. In the description herein, 0 is assumed to be the most-likely-to-occur amplitude. The collecting or assuming statistics includes tracking the quantized non-zero-valued coefficient amplitudes and the number of zero-valued coefficients preceding the non-zero amplitude, i.e., tracking the runlengths of zeros which precedes any non-zero amplitude along a specified path, e.g., a zigzag scan path for a block of coefficients, e.g., an n by n coefficient block.

2D-VLC is used in common transform coding methods such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Interframe and intraframe images typically have different 2D-VLC tables. The DC component is typically separately encoded. Furthermore, the 2D-VLC table may be truncated so that the least frequently occurring events use an escape code followed by a fixed length code. A special "EOB" code is used to indicate the end of block when all remaining coefficients are zero.

For still images, all images are "intraframe" and a unique 2D-VLC table is exclusively designed to code the block based quantized coefficients.

In the latest coding developments, 2D-VLC has further been extended to multiple tables to adapt to video contents.

FIG. 1 shows how a table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. An escape code together with a fixed length code is used for relatively less likely-to-occur combinations The advantage of 2D_VLC is that both the position of each non-zero-valued coefficient as indicated by the runlength, and the quantized amplitude value are coded simultaneously as a pair using one 2D-VLC table. This may result in shorter codes, i.e., codes that use fewer bits than using separate VLC tables for each non-zero-valued coefficient and for its amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero-valued coefficient in the block, RUN, the runlength of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero-valued coefficient is the last one is incorporated into the event.

FIG. 2 shows how a table lookup may be used to implement 3D-VLC.

One deficiency of 2-D VLC methods is that every non-zero-valued coefficient needs to be accompanied by one runlength to identify its position. In block based transform coding, it may occur that there are a number of consecutive non-zero-valued coefficients along the pre-determined coding path. This may especially occur in intraframe coding and high bit rate interframe coding, where there are likely to be clusters of consecutive non-zero-valued coefficients. The 2D-VLC method requires a separate runlength code, e.g., C10, C20, C30 . . . , etc., for each of the consecutive non-zero-valued coefficients. Thus there is a need in the art for a method that provides for efficiently encoding a sequence of consecutive non-zero coefficient values.

Furthermore, in low-bit rate interframe coding, there are likely to be mostly very-low amplitude coefficients, and these non-zero-valued coefficients are likely to be scattered. Furthermore, the clustered or scattered nature of the distribution is specifically dependent upon the block content itself regardless of still image where there are only "intraframe" blocks, or moving video where there are both interframe and intraframe blocks. The distribution of quantized coefficients along the path generally includes various clustered non-zero values in intraframe coding and high bit rate interframe coding and more scattered non-zero values in low bit rate interframe coding. It is thus rather inefficient to use only the same variable length coding technique to code the intraframe or interframe transform coefficients over and over again without worrying about the clustering or scattering of the coefficient distributions.

With these observations in mind, the above-mentioned Basic Hybrid VLC Method was developed that encodes position and amplitude of transform coefficients separately and takes advantage of the nature of the distribution of the transform coefficients in the low frequency and the high frequency regions. Furthermore, the above-mentioned Extended Hybrid VLC Method was invented for, and provides an alternative coding method for the high frequency region by taking advantage of the very few amplitude values in the high frequency region, especially, for example, for low bit rate and interframe applications.

In one embodiment of the Basic Hybrid VLC Method, two independent types of the coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of runs of none or more consecutive zero-valued coefficients using a run-length coding method of a third type. The encoding further includes coding the amplitude values and sign of the non-zero-valued coefficients.

In one embodiment of the Extended Hybrid VLC Method, a coding method is used in the second region that takes into account that almost all non-zero-valued coefficients in the high frequency region are ±1. No amplitude coding is needed to encode runs of consecutive zeroes that end a coefficient of amplitude 1. An exception (escape) code is included to encode those rare non-zero-valued coefficients that have values other than ±1.

Although the Basic Hybrid VLC Method and the Extended Hybrid VLC Method provide potential improvement beyond using a single 2D-VLC technique for all quantized coefficients in a block, these methods may not be optimal for various reasons, including that the dynamic nature of the quantized block coefficients may not exactly match the model assumed in a pre-determined coding techniques. By the dynamic nature we mean changed in block-to-block, and image to image in one or more of the cluster or scatter of the coefficients in a region, in whether a region has significant consecutive runs of non-zero-valued coefficients or mostly isolated non-zero-valued coefficients, in whether a region has coefficients with amplitudes dominated by a few values or even a single value, and so forth.

There is a need in the art for variable length coding methods applicable to quantized coefficients that include determining the nature of the coefficients themselves and using such determined nature information to select the coding method.

Furthermore, one or more patents describing some existing 2D-VLC coding methods have recently been the subject of patent litigation. Thus, there is a need in the art for alternate methods that can replace commonly used 2D-VLC methods that have been the subject of such litigation.

SUMMARY

Presented herein are a method, an apparatus and a carrier medium carrying instructions that when executed on a processor perform a method to variable length code an ordered series of digital signals that are an ordered series of quantized transform coefficients of an image block. The method classifies the series into one of a plurality of classes. Each class has a corresponding coding process that is applicable to the statistical distribution of the coefficients in the series. The series is coded according to the particular coding process corresponding to the class of the classifying.

In general, the method codes a series that includes a most likely to occur amplitude and at least one other amplitude. The method is to reduce the amount of data used to represent the digital signals and to form codewords such that the more likely to occur values or sequences of values of digital signals are represented by relatively short codewords and the less likely to occur values or sequences of values of digital signals are represented by relatively long codewords. The most-likely-to-occur value is usually 0, and the most likely to occur non-zero amplitude is 1.

In one embodiment, the method includes classifying the series into a particular class of a plurality of classes according to the distribution of amplitudes of the digital signals, each class having a corresponding coding process of forming the codewords for the series. For the particular class of the series, the method includes applying the coding process corresponding to the class to form a set of codewords of the series. The method further includes adding an indication to the formed codewords to indicate the particular class.

In one implementation, the transformed block of image data includes a DC term, and the DC term is separately encoded, such that the series of digital signals is a set of non-DC quantized coefficients of a transformed block of image data.

In one embodiment, the classifying uses the series of coefficients. In a particular version, the classifying selects the class according to which corresponding coding process produces the most compressed bitstream.

Other aspects and features will be clear from the drawings, description, and claims.

BRIEF DESCRIPTION OF THE DRAWINGS

FIGS. 7A and 7B show embodiments of runlength code tables for coding runs of consecutive non-zero-valued coefficients and runs of consecutive zero-valued coefficients, respectively.

FIG. 8 shows one embodiment of a coding table for variable length coding the runs of zero-valued coefficients in a region or series in which the non-zero-values are scattered and likely to include some coefficients of amplitude higher than 1.

FIG. 9 shows one embodiment of a table for such codes providing the variable length code for a runlength of consecutive 0's ending in a single non-zero-valued coefficient.

DETAILED DESCRIPTION

Figure 1:
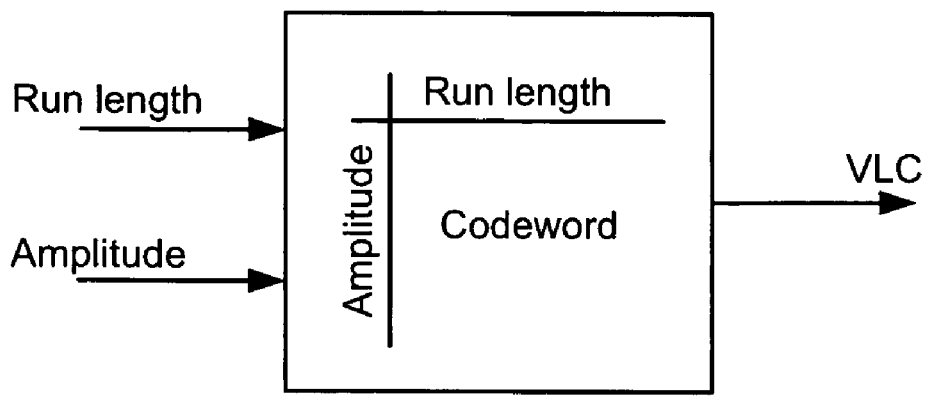
FIG. 1 shows how a prior art 2-D VLC method may be implemented by a table look-up.
Figure 2:
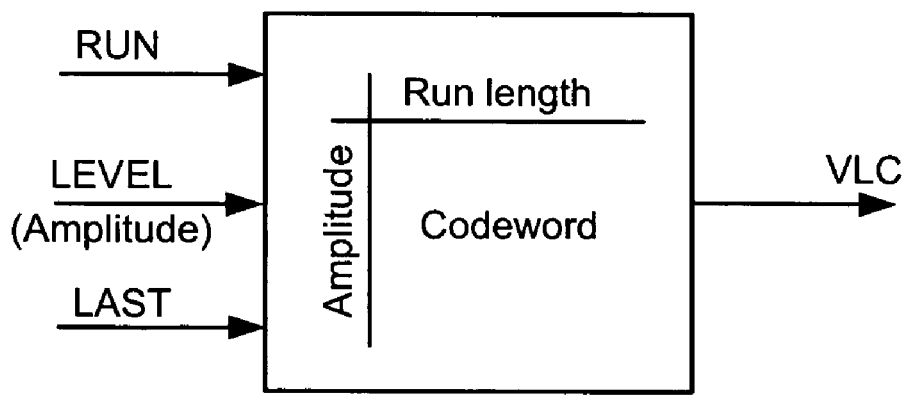
FIG. 2 shows how a common prior art variation of 2-D VLC called 3D-VLC may be implemented by a table look-up.

One aspect of the invention uses a plurality of coding processes for the ordered series of quantized coefficients of a transformed block of image data. By a coding process is meant a coding method or combination of methods. The series is obtained by scanning the quantized transform coefficients along a selected path on the transform domain. The series of quantized coefficients is classified into one of a plurality of classes according to how coefficients are distributed in the series. For each class, a corresponding set of one or more of the provided coding processes is used to code the series. Thus, the coding method or methods applied to the block of data depends on the determined distribution of quantized transform coefficients.

In one embodiment, the above-referenced Basic Hybrid VLC Method and Extended Hybrid VLC Method provide the types of coding methods.

The classification of the series of quantized coefficients into a plurality of classes will be illustrated by classification into four classes. The invention, however, is not restricted to such a number of classes.

The above-referenced Basic Hybrid VLC Method and Extended Hybrid VLC Method describe how a series may be divided into regions. For the purpose of illustration, the description below will be mostly in terms of two regions, which can be called a low-frequency region, and a high frequency region. For classes that include two such regions, a breakpoint along the path of the ordering of the coefficients is established to identify a first, e.g., low-frequency region and a second, e.g., high frequency region.

Blocks of image data in the form of an ordered sequence of quantized transform coefficients are scanned prior to coding ("pre-scanned") and classified into the following four classes, denoted here as class 1, class 2, class 3, and class 4.

Class 1 (clustered and large): Many non-zero-valued coefficients along the ordering of the coefficients are of non-zero values, including a significant number that are not ±1. The non-zero valued coefficients are clustered throughout the ordering such that there is no clear breakpoint along the path of the ordering of the coefficients to identify a first region, e.g., low-frequency region in which non-zero-valued coefficients are clustered and a second, e.g., high frequency region in which the non-zero-valued coefficients are scattered.

Class 2 (a clustered and large region and a scattered region): A significant number, e.g., more than 4 non-zero-valued coefficients along the ordering of the coefficients are of non-zero-valued values, including a significant number, e.g., more than 2 that are not ±1. There is a breakpoint along the path of the ordering of the coefficients to identify a first, e.g., low-frequency region in which the non-zero valued coefficients are substantially clustered and a second, e.g., high frequency region in which the non-zero valued coefficients are scattered.

Class 3 (a clustered and small region and a scattered and small region): The non-zero-valued coefficients along the ordering of the coefficients are essentially dominated by coefficients that are ±1. There is a breakpoint along the path of the ordering of the coefficients to identify a first, e.g., low-frequency region in which these non-zero valued coefficients are substantially clustered and a second, e.g., high frequency region in which these non-zero valued coefficients are scattered.

Class 4 (small and scattered): The non-zero-valued coefficients along the ordering of the coefficients are essentially dominated by coefficients that are ±1. The non-zero valued coefficients are scattered throughout the ordering such that there is no clear breakpoint along the path of the ordering of the coefficients to identify a first region, e.g., low-frequency region in which non-zero-valued coefficients are clustered, and a second, e.g., high frequency region in which these non-zero valued coefficients are scattered.

For each class, a corresponding coding process is used which may include using a combination of coding methods. The following are the coding methods used.

The Clustered and Large-Value Region Method.

The following combination of encoding methods, in combination called "the clustered and large-value region method" is used for a region—which may be the complete block—in which the non-zero-valued coefficients—in general coefficients having other than the most likely to occur values—include a number having an amplitude larger than 1—in general, an amplitude other than the next to most likely to occur value, and in which the non-zero-valued coefficients—in general coefficients having other than the most likely to occur values—are clustered. The method includes identifying runs of non-zero-valued coefficients and runs of zero-valued coefficients. The lengths of the runs of non-zero-valued coefficients are encoded using a first runlength coding method. The amplitudes in the runs of non-zero-valued coefficients are encoded using a first amplitude coding method. The signs of the non-zero-valued coefficients are encoded using a sign bit. The lengths of the runs of zero-valued coefficients are encoded using a second runlength coding method. See the above-referenced Basic Hybrid VLC Method for more details of the first and second runlength coding methods and the first amplitude coding method.

In one embodiment, the first and second runlength coding methods are each implemented using runlength coding tables, e.g., such that encoding using the first runlength coding method includes looking up a first coding table, and encoding using the second runlength coding method includes looking up a second coding table.

FIGS. 7A and 7B respectively, show runlength code tables—Table 1 with reference numeral 701 and Table 2 with reference numeral 702—for variable length coding runs of consecutive non-zero-valued coefficients and runs of consecutive zero-valued coefficients, respectively. $c_i$ and $c'_i$ denote the codes for runs of i consecutive non-zero-valued coefficients and zero-valued coefficients, respectively, where i is the runlength: $i = 1, 2, \ldots$.

As an example, assuming the ordered series of quantized coefficients along the ordering path in the first frequency region starts with:

2 3 2 −1 0 1 2 0 0 1 −1 1 0 0 . . .

To determine the runlengths, this series may be written as:

N N N N 0 N N 0 0 N N N 0 0 . . .

where N represents any non-zero-valued coefficient and 0 represents a zero-valued coefficient.

Denote by $r_i$ the run of i consecutive non-zero-valued coefficients, and $r'_i$ the run of i consecutive zero-valued coefficients. The ordered sequence of the example then starts with:

r4 r'1 r2 r'2 r3 r'2 . . .

The result of encoding the runlengths but not amplitudes of this pattern can then be written as:

c4 c'1 c2 c'2 c3 c'2 . . .

To complete the coding method, included with the codeword of each run of non-zero-valued coefficients are codewords for each amplitude in the run, and further bits for the sign of each coefficient for transform whose coefficients can be positive or negative, e.g., the commonly used DCT transform. In one embodiment, the amplitudes are each encoded using a variable length code, and the signs are each encoded using a sign bit. Denote by $A_k$, k=1, 2, 3, . . . the amplitude codes for amplitudes 1, 2, . . . , respectively, according to the first amplitude coding method, denote by S+ and S− the sign bit codes for positive and negative coefficients, respectively, and denote concatenation by +. The example sequence above is then encoded as follows:

(c4+A2+S++A3+S++A2+S++A1+S−)+c'1+(c2+A1+S++A2+S+)+c'2+(c3+A1+S++A1+S−+A1+S+)+c'2 . . .

In one embodiment, the $A_k$, k=1, 2, . . . are variable length codes such that the most likely to occur non-zero amplitude, typically 1, has a shorter codeword A1 than the codewords for other less likely to occur amplitudes.

In one embodiment, it is assumed that the series—or region if the method is for a region of a series of coefficients—starts with a run of one or more non-zero-valued coefficients. Therefore, the first codeword is always a codeword from the runlength coding method of the first kind. A code is included for when the series (or region) starts with a run of one or more zeros to indicate that the first code used is the code for runs of zeroes. In one embodiment in which the first region of the series, or the whole series is encoded using the clustered and large-value region method, the DC component is separately sent, such that the first coefficient is the first non-DC coefficient along the ordering.

Thus, for example, indicating by RP the codeword in the coding method of the first kind that indicates starts with a run of one or more zero-valued coefficients, suppose the series (sub-series) of coefficients starts with:

0 2 3 2 −1 0 1 2 0 0 1 −1 1 0 0 . . .

In one embodiment, the codewords for this series or sub-series part is:

RP+c'1+(c4+A2+S++A3+S++A2+S++A1+S−)+c'1+(c2+A1+S++A2+S+)+c'2+(c3+A1+S++A1+S−+A1+S+)+c'2 . . .

In another embodiment, a codeword is included in the coding method that indicates that the series has no non-zero values. In another embodiment, in which the clustered and large-value region method is used for a first region, such a codeword is also used to indicate that all remaining coefficients in the first region are zero. This codeword is called skip-to-boundary (SKP) herein. Note that the SKP code equivalent to an end of block (EOB) code if there are no non-zero coefficient in the next region(s) or if there is no second region.

The Scattered Region Method

The following combination of methods, in combination called "the scattered region method" is used for a region—which may be the complete block—in which the non-zero-valued coefficients—in general those having other than the most likely to occur values—include a significant number of larger than 1 amplitudes—in general amplitudes other than the next most likely to the most likely to occur amplitude, and in which the non-zero-valued coefficients are mostly scattered. The method includes identifying runs of none or more zero-valued coefficients—in general runs of none or more coefficients having the most likely to occur value. The lengths of the runs of zero-valued coefficients are encoded using a third runlength coding method. Each such run of none or more zero-valued coefficients ends in a single non-zero-valued coefficient. The amplitude of these non-zero-valued coefficients is encoded using a second amplitude encoding method. The signs of the non-zero-valued coefficients are encoded using a sign bit. See below, and also the above-referenced Basic Hybrid VLC Method for more details of the third runlength coding method and the second amplitude coding method.

In one embodiment, encoding using the third runlength coding method includes looking up a third runlength coding table.

FIG. 8 shows a coding table Table 3, reference numeral 801, for variable length coding the runs of zero-valued coefficients in a region or series in which the non-zero-values are scattered and likely to include some coefficients of amplitude higher than 1. Table 3 describes the a third runlength coding method that provides a code for each run of zero-valued coefficients. $c''_i$, i=0, 1, 2, . . . represents the runlength code used to encode a runlength of i consecutive 0's, where i=0, 1, 2, . . . .

In one variant of the invention applicable to the final region when the series is divided into regions, or to a single region, an end code, denoted EOB herein, is used to indicate that the remaining coefficients in the final region or the series are all zero.

As an example, suppose that the scattered region is the second of two regions, and that the ordered series quantized coefficients along the pre-determined path for the scattered region is as follows:

0 0 0 1 0 0 1 −2 0 0 0 0 0 1 0 0 . . . 0.

This series may be written as:

0 0 0 N 0 0 N N 0 0 0 0 0 N 0 0 . . . 0 where N represents any non-zero-valued coefficient and 0 represents a zero-valued coefficient.

Denote by $r''_i$ the runs of i consecutive zero-valued coefficients, i=0, 1, 2, . . . . In one embodiment, each non-zero valued coefficient in the series of the second region is assumed to be preceded by a run of zero-valued coefficients, so that the second of two consecutive non-zero-valued coefficients is preceded by a run of no zero-valued-coefficients (i=0). The above example ordered sequence of runs of zeroes in the second region may then be written as:

r''3 r''2 r''0 r''5 EOB where EOB is used to indicate that the remaining coefficients are all 0, and in which it is understood that there is exactly one non-zero-valued coefficient between each run of 0's. Using the codes of Table 3_for the runlengths, the result of encoding the runs in the series of the second region is then:

c''3 c''2 c''0 c''5 EOB

If quantized coefficients along a specified path in the second region are of values greater than one then in one embodiment, the encoding process includes a variable length amplitude code after the runlength code to encode the amplitude of the non-zero-valued coefficient, and a sign code for the non-zero-valued coefficient that follows the run of 0's. Denote by $A''k$, $k=1, 2, 3, \ldots$ the variable length amplitude codes according to the second amplitude coding method for amplitudes $1, 2, \ldots$ respectively, denote by S+ and S− the sign bit codes for positive and negative coefficients, respectively, and denote concatenation by +. The above example sequence of the second region is then encoded as follows:

(c''3+A''1+S)+(c''2+A''1+S+)+(c''0+A''2+S−)+(c''5+S+)+ EOB.

In one embodiment, the $A''k$, $k=1, 2, \ldots$ are variable length codes such that the most likely to occur non-zero amplitude, typically 1, has a shorter codeword $A''1$ than the codewords for other less likely to occur amplitudes.

Note that in one embodiment, the second amplitude coding method (the $A''i$ values, $i=1, 2, \ldots$) for quantized coefficient amplitudes that occur in the second region is different from the first amplitude coding method (the $Ai$ values, $i=1, 2, \ldots$) for quantized coefficient amplitudes that occur in a clustered and large-value region. In an alternate embodiment, the same amplitude coding is used as the first and second amplitude codes $Ai$ and $A''i$, respectively.

In another embodiment, the conventional 2D-VLC method is used for regions in which the non-zero-valued coefficients include a significant number of larger than 1 amplitudes, and in which the non-zero-valued coefficients are mostly scattered.

The Scattered and Small-Value Region Method

The following combination of methods, in combination called "the scattered and small-value region method" is used for a region—which may be the complete block—in which the non-zero-valued coefficients are dominated by amplitude-1 coefficients, and in which the non-zero-valued coefficients are mostly scattered. The method includes identifying runs of none or more of zero-valued coefficients that end in a single non-zero-valued coefficient. The lengths of the runs of zero-valued coefficients that end in the non-zero-valued coefficient are encoded using a fourth runlength coding method as described for encoding the high-frequency region in the above-referenced Extended Hybrid VLC Method. The encoding assumes that the ending non-zero-valued coefficient has amplitude 1, and no further amplitude encoding is included for such events. Non-amplitude-one ending coefficients are assumed to be exceptions. Such exceptions are identified, and an exception code (also called an escape code) is used to indicate such exceptions. The amplitude of these non-zero-valued coefficients of amplitude greater than 1 is encoded using a third amplitude encoding method. The signs of the non-zero-valued coefficients are encoded using a sign bit. See below, and also the encoding of the high frequency region in the above-referenced Extended Hybrid VLC Method for more details of the fourth runlength coding method and the third amplitude coding method.

The codes according to the fourth runlength coding method may be represented in a table. FIG. 9 shows a table, Table 4, with reference numeral 901 for such codes. $c'''i$, $i=0, 1, 2, \ldots$ represents the runlength code used to encode a runlength of i consecutive 0's ending in a non-zero-valued coefficient in such region or the whole series. Table 4 (901) also includes a code to indicate when the ending non-zero-amplitude is other than the most common non-zero amplitude, i.e., an amplitude greater than 1. Because such events are regarded as not very likely, we call them "exceptions." An exception is indicated as Exc in Table 4 (901). Such an exception is encoded according to an aspect of the invention by the codeword as if the run of 0's ended in 1 followed by an escape code, denoted ESC''', followed by an encoding of the amplitude according to the third amplitude encoding method.

Another aspect of the invention is that an end code, denoted EOB herein, is used to indicate that the remaining coefficients in the second region are all zero.

As an example, suppose the ordered series quantized coefficients along the pre-determined path for a scattered and small-value region is:

0 0 0 1 0 0 2 −1 0 0 0 0 0 1 0 0 . . . 0.

Denote by $r'''i$ the run of i consecutive zero-valued coefficients that end in a non-zero amplitude of 1, and by $r'''i+Esc$ the run of i consecutive zero-valued coefficients that end in a non-zero amplitude greater than 1, where $i=0, 1, 2 \ldots$. In one embodiment, each non-zero valued coefficient in the series of the second region is assumed to be preceded by a run of zero-valued coefficients, so that the second of two consecutive non-zero-valued coefficients is preceded by a run of non-zero-valued-coefficients ($i=0$). The runs of the series of the scattered and small-value region may then be written as:

r'''3(r'''2+Exc''')r'''0 r'''5 EOB.

where EOB is used to indicate that the remaining coefficients are all 0, and in which it is understood that there is exactly one non-zero-valued coefficient between each run of 0's. If quantized coefficients along a specified path in the scattered and small-value region are of values greater than one then in one embodiment, the encoding process includes a amplitude code using the third amplitude coding method after the runlength code and the exception code to encode the amplitude of the non-zero-valued coefficient, and a sign code for the non-zero-valued coefficient that follows the run of 0's. Denote by $A'''k$, $k=2, 3, \ldots$ the amplitude codes for amplitudes $2, 3, \ldots$ respectively, using the third amplitude encoding method, and denote by S+ and S− the sign bit codes for positive and negative coefficients, respectively, and denote concatenation by +. Using the codes of Table 4 (901) for the runlengths, the result of encoding the runs in the series of the second region is then:

(c'''3+S+)+(c'''2+ESC'''+A'''2+S+)+(c'''0+S−)+(c'''5+S+)+ EOB, where EOB is also used here to denote the codeword to indicate the remaining coefficients are zero-valued, and ESC''' is the escape code for the exception in the second region.

In one embodiment, the third amplitude coding method (the $A'''i$ values, $i=2, 3, \ldots$) for quantized coefficient amplitudes uses a variable length code, such that, assuming an amplitude 2 is more likely to occur than larger amplitudes, the amplitude code $A'''i$ is shorter than the code for amplitudes larger than 2.

Note further that that in one embodiment, the third amplitude coding method (the $A'''i$ values, $i=2, 3, \ldots$) for quantized coefficient amplitudes is different from the first amplitude coding method (the $Ai$ values, $i=1, 2, \ldots$) and the second amplitude coding method (the $A''i$ values, $i=1, 2, \ldots$) for quantized coefficient amplitudes.

The Clustered and Small-Value Region Method

The following combination of methods, in combination called "the clustered and small-value region method" is used for a region—which may be the complete block—in which the non-zero-valued coefficients are dominated by amplitude-1 coefficients, and in which the non-zero-valued coefficients include significant clusters. The method includes identifying runs of amplitude-1 coefficients and runs of zero-valued coefficients. The lengths of the runs of amplitude-1 coefficients are encoded using a fifth runlength coding method, which in one embodiment is the same as the first runlength coding method described for encoding the non-zero-valued coefficients in the low-frequency region in the above description and in the above-referenced Basic and Extended Hybrid VLC Methods. In another embodiment, the fifth runlength coding method is different than the first. The signs of the amplitude-1 coefficients are encoded using a sign bit. The method further includes identifying each non-amplitude-one non-zero-valued coefficient. The amplitudes of these non-zero-valued coefficients of amplitude greater than 1 are encoded using a fourth amplitude encoding method, which in one embodiment is the same as the third amplitude encoding method used in the scattered and small-value region method, and in another embodiment, is a different amplitude encoding method. The signs of the non-amplitude-1 non-zero-valued coefficients are encoded using a sign bit. The lengths of the runs of zero-valued coefficients are encoded using a sixth runlength coding method, which in one embodiment is the same as the second runlength coding method described above for encoding the runs of zero-valued coefficients in the low-frequency region, also described in the above-referenced Basic and Extended Hybrid VLC Methods. In another embodiment, the sixth runlength coding method is different from the second.

In an alternate embodiment of the clustered and small-value region method, the method includes identifying runs of non-zero-valued coefficients and runs of zero-valued coefficients. The lengths of the runs of non-zero-valued coefficients are encoded using the fifth runlength coding method. The encoding assumes that the non-zero-valued coefficient has amplitude 1, and no further amplitude encoding is included for such events. The signs of the non-zero-valued coefficients are encoded using a sign bit. The method further includes identifying each non-amplitude-one non-zero-valued coefficient. Such coefficients are assumed to be rare ("exceptions"). Such exceptions are identified, and an exception code (also called an escape code) is used to indicate such exceptions. The amplitude of these non-zero-valued coefficients of amplitude greater than 1 is encoded using the fourth amplitude encoding method. The lengths of the runs of zero-valued coefficients are encoded using the sixth runlength coding method.

The above-described methods or combinations of methods are then used in the appropriate regions in each class of block as follows.

Note that how to determine the codes for the coding tables is straightforward according to the statistical distribution of the coefficients in the image blocks. In one embodiment, statistics are collected of typical images, and runlength code tables are constructed according to the statistics. See for example, above-referenced Basic Hybrid VLC Method and Extended Hybrid VLC Method for more description.

For a class 1 block, the corresponding coding process (method or combination of methods) is the clustered and large-value region method.

For a class 2 block, the corresponding encoding method or combination of methods includes establishing a breakpoint along the path of the ordering of the coefficients to identify a first, e.g., low-frequency region and a second, e.g., high frequency region. The encoding of low frequency coefficients uses the clustered and large-value region method, and the encoding of the second, e.g., high-frequency region includes using the scattered region method.

For a class 3 block, the corresponding encoding method or combination of methods includes establishing a breakpoint along the path of the ordering of the coefficients to identify a first, e.g., low-frequency region and a second, e.g., high frequency region. The encoding of low frequency coefficients uses the clustered and small-value region method, and the encoding of the second, e.g., high-frequency region includes using the scattered and small-value region method.

For a class 4 block, the corresponding encoding method or combination of methods is the scattered and small-value region method.

Figure 3:
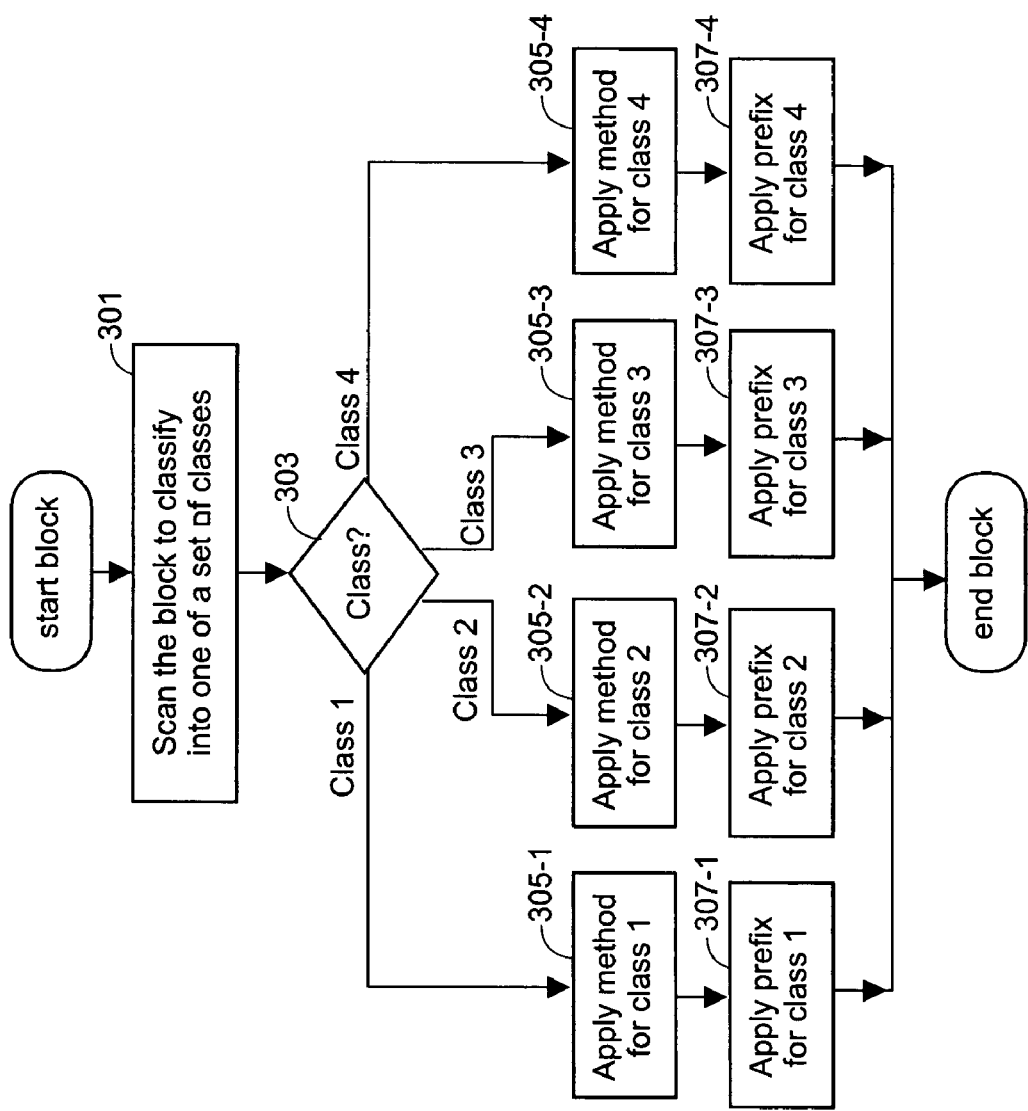
FIG. 3 shows a flow chart of a method embodiment of the invention.

FIG. 3 shows a flow chart of a method embodiment of the invention. For an ordered sequence of quantized transform coefficients of a block of image data, step 301 scans the ordered series of quantized coefficients to determine which class the coefficient block belongs to. According to the determined class, the next step is one of steps 305-1, 305-2, 305-3, and 305-4, which respectively carry out the coding processes corresponding to class 1, class 2, class 3, and class 4. The results are the encoded bitstreams for the coefficients of the block. According to the determined class, the next step is one of steps 307-1, 307-2, 307-3, and 307-4, which each applies a 2-bit prefix to the determined bitstream corresponding to the determined class of the block.

While in one embodiment, a fixed two-bit code is used to indicate the class, in another embodiment, in the case that some class or classes is/are more likely to occur than others, a variable length code with an average length of less than 2-bits is used to identify the class. Note also that the adding of the indication of the class can be carried out before, after, or even as part of the actual encoding process. Furthermore, if it is likely that blocks that follow each other, e.g., that correspond to a particular region in a region, have the same class, an indication is only added between blocks to indicate a change from one block class to another, rather than the indication used for each block.

In an alternate embodiment, rather than a code to indicate the class preceding each set of codewords for the block, a differential codeword indicating the difference in the class is be used. Such differential encoding is likely to require fewer bits because it is likely that blocks that follow each other are highly correlated.

Furthermore, for use in some types of coded data streams, e.g. MPEG, each video sequence may be grouped. In MPEG-1, for example, each video sequence is composed of a series of Groups of Pictures (GOP's). A GOP is composed of a sequence of pictures (frames). A frame is composed of a series of SLICEs. A SLICE is composed of a series of macroblocks, and a macroblock is composed of a small number of blocks, e.g., (4 for luminance and 2 for chrominance) and possibly a motion vector. For such an embodiment, the classification may be made at the higher level, e.g., macroblocks, or at the level of a SLICE, or at the level of a GOP. This provides for less overhead to indicate the class.

In yet another embodiment, the class codes is sent separately. A first class is selected for the first block. A runlength code for the number of blocks to skip until the next change of class is sent, together with an indication of the next code. This is continued until the class of all codes is sent.

The Classification

The classifications of a series of quantized coefficients in one embodiment includes different classifications according to the type of image block. In such an embodiment, the plurality of classes depends on one or more of whether the image block is for:

still image coding vs. moving image coding;
 intraframe image coding vs. interframe coding;
 standard definition television (SDTV) images vs. high definition television (HDTV) images;
 high bit rate coding methods vs. low bit rate coding methods;
 DCT vs. non-DCT transforms;
 and so forth.

Thus, different sets of classes, classifications, and corresponding coding processes exist for blocks according to on one or more of the above types of image blocks.

The classification process itself uses the data of the series of coefficients in the blocks, such that different classifications typically exist in the same image frame. Such classification is called data-dependent classification.

One version of the data-dependent classification process of step 301 includes examining the statistical distribution of the coefficients in the blocks. The classification process uses one or more of the following set of statistical measures: the run lengths of consecutive non-zero-valued coefficients, the run lengths of consecutive zero-valued coefficients, the amplitude of the non-zero-valued coefficients, and the separability of the series into two contiguous sub-series, a first sub-series with clustered coefficients and a second sub-series with scattered non-zero-valued coefficients.

Figure 4:
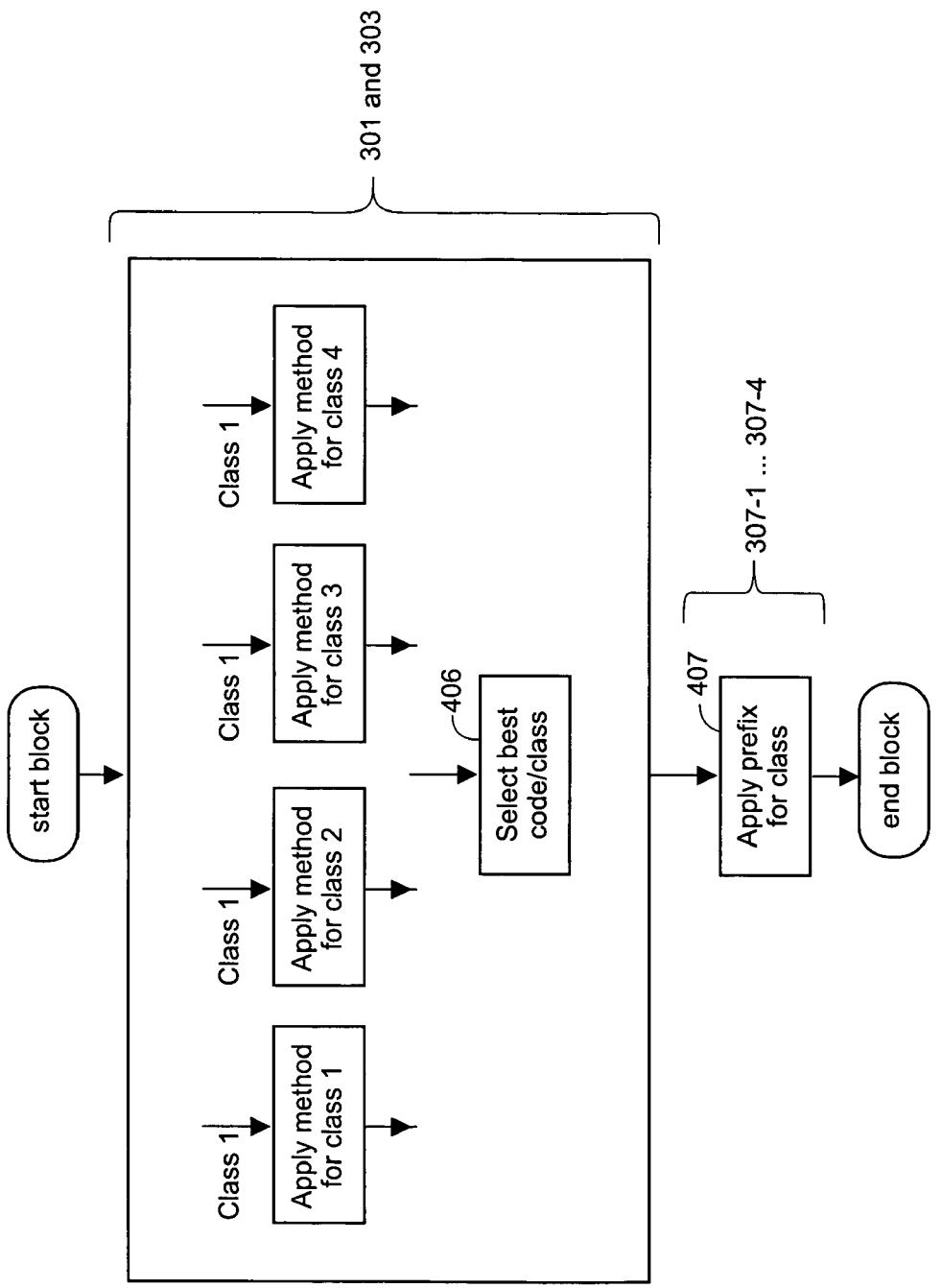
FIG. 4 shows a flow chart of a method embodiment that includes as part of the classifying, coding the blocks by each corresponding coding process and comparing the results to select the method that provides the best compression.

The preferred method classifies by calculating the results of applying the coding processes corresponding to the different classes, and compares the resulting compression achieved by applying the corresponding coding processes. FIG. 4 shows a flow chart of a method embodiment that includes as part of step 301, scanning the ordered series of quantized coefficients to determine which class the coefficient block belongs and step 303 of selecting the class, the steps of coding the blocks (steps 305-1, . . . , 305-4) by each corresponding coding process and comparing the result to select the method that provides the best compression, i.e., the least number of bits for the coded block. In step 406, the selecting of the best class for a block is by selecting the code that leads to the fewest bits in the coded data. Following the selection, because the coding step would already have been carried out, step 407 applies the indication, e.g., as a prefix code. In some embodiments, adding the prefix code may be carried out earlier.

Figure 5:
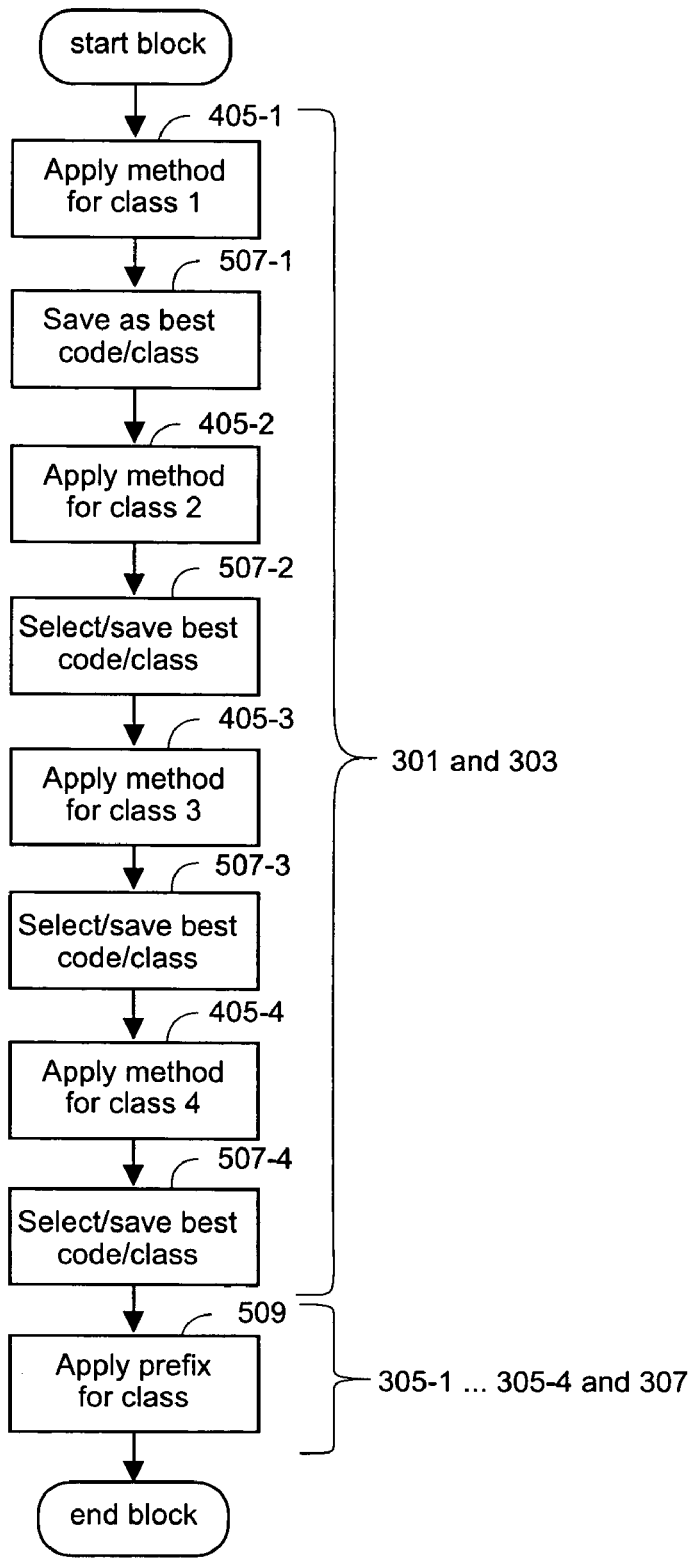
FIG. 5 shows a flowchart of one implementation of the embodiment of FIG. 4 in which the applying of the corresponding encoding processes is carried out sequentially on the series of coefficients.

FIG. 5 shows a flowchart of one implementation wherein the applying of the corresponding encoding processes is carried out sequentially on the series of coefficients. After each such processing by a corresponding process, a comparison is made and the set of codewords for that process that produces the least number of coded bits, i.e., the better compression is maintained, as well as an indication of the class selected. The coding by each of the class's corresponding process, of course, can be in any order, and is shown in FIG. 5 as the method of class 1, followed by that for classes 2, 3, and 4. As shown in FIG. 4, in steps 405-1, . . . , 405-4, the series of quantized coefficients is coded by each of the four coding processes corresponding to the four different classes, and in step 507-1 the first result is saved, then in steps 507-2, 507-3, and 507-4, the previously saved result is compared with the newly calculated result of step 405-2, 405-3, and 405-4, respectively, and if the new result is better than that saved, the better result is saved. Thus, after step 405-4, the best result is saved. In step 509, the code, e.g., 2-bit code indicating the class is added, e.g., as a prefix. In an alternate, the prefix is added whenever the first or better result is saved in steps 507-1, 507-2, 507-3, and 507-4 respectively. In such an embodiment, step 509 is not carried out at the end.

Figure 6:
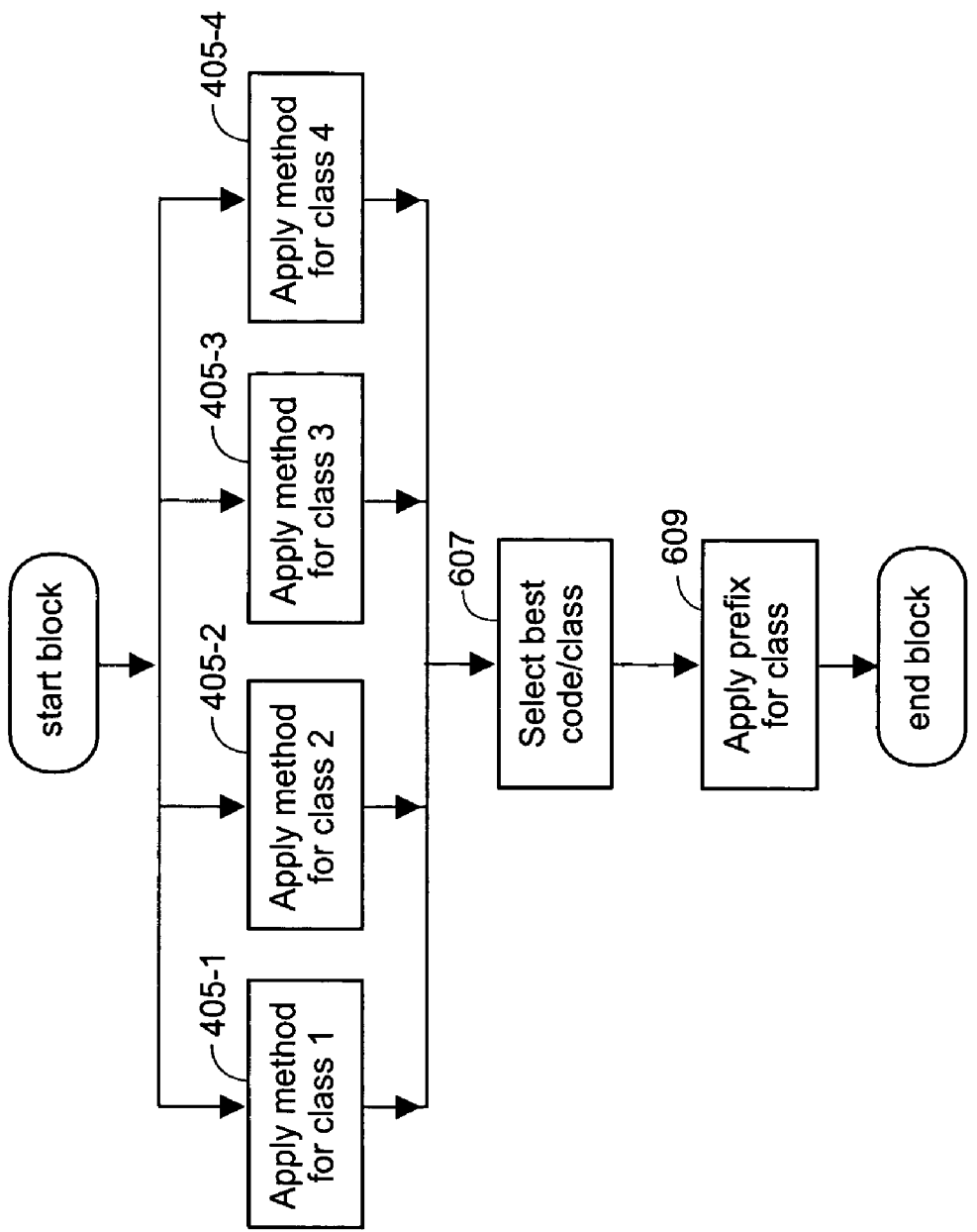
FIG. 6 shows a flowchart of an alternate implementation of the embodiment of FIG. 4 in which the applying of the corresponding encoding processes is carried out in parallel on the series of coefficients.

FIG. 6 shows a flowchart of another implementation wherein the coding processes 405-1, 405-2, 405-3, and 405-4, respectively, that correspond to each respective class are carried out in parallel on the series of coefficients. At the end of the methods being applied, in step 607, a comparison is made of the results and the class chosen according to which corresponding coding processes produced the least number of coded bits. In a step 609, the code, e.g., 2-bit code indicating the class is added, e.g., as a prefix.

The Breakpoint Defining the Regions

Some of the classes described above include a breakpoint that defines a first, eg., low-frequency, and a second, e.g., high frequency region for the series of quantized transform coefficients. The following discussion applies to such classes and the corresponding coding processes that include selecting a breakpoint to define the regions.

For such classes, one version uses a fixed breakpoint between the first and the second region. In one embodiment, the fixed breakpoint is pre-determined for each type of image and for each type of compression method by running experiments collecting statistics on a set of typical samples of such images. Typically, different breakpoints are determined for:

intraframe and still image coding vs. interframe coding;
  standard definition television images (SDTV) vs. HDTV images;
  high bit rate coding methods vs. low bit rate coding methods;
  DCT vs. non-DCT transforms;
  and so forth.

When fixed, e.g., pre-selected breakpoints are used, there is already an indication passed on to the decoder to indicate the type of image, e.g., whether interframe or intraframe, or the type of coding, high-bit-rate or low-bit-rate. Thus, there is typically no need to send a further indication to the decoder of the breakpoint. In one embodiment, a first breakpoint is used for interframe data that is for a first kind of interframe coding, e.g., relatively high-bit-rate interframe coding, and a second breakpoint is used for interframe data that is for a second kind of interframe coding, e.g., relatively low-bit-rate interframe coding.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 127 non-zero amplitudes using the DCT, and observed that a breakpoint of 22 worked for most images, although some images worked well with a breakpoint of about 10. Therefore, in one embodiment for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression used. Other breakpoint selection criteria are also possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

Note that when a class indication is also sent, a codeword is used that indicates both the class of coding as well as the pre-selected one of a finite set of breakpoints used.

While typically, the set of possible breakpoints is a small subset of the possible positions in the series, in yet another variation, the image dependent breakpoint is selected from anywhere in the series, or, in an alternate variation, from anywhere along a sub-range.

In one embodiment the breakpoint defines a fixed boundary between the first and second region, and this is called a "hard" boundary herein. In such an embodiment, a sequence of consecutive non-zero values, or a sequence of consecutive zero-valued coefficients that crossed the breakpoint would be regarded as a first sequence in the first region up to the breakpoint, and a second sequence in the second region. In an alternate embodiment, there may be a plurality of breakpoints defining a plurality of hard breakpoints.

In another and preferred embodiment, a breakpoint defines what is called herein a "soft" boundary in that any sequence of consecutive zero, or non-zero values that started in the first region would be encoded in the first region even if it crossed the breakpoint. Thus, the actual boundary for a particular block of coefficients might extend beyond the breakpoint. For example, consider the following ordered series of digital signals of coefficients:

2 3 2 –1 –1 1 1 –1 1 0 1 2 0 0 1 –1 1 0 0 . . .

And suppose a breakpoint of up to and including 7 is used.

In one embodiment, the breakpoint forms a hard boundary. In such a case, the first region is:

2 3 2 –1 –1 1 1 and the second region is:

1 –1 0 1 2 0 0 –1 0 0 . . .

In another embodiment, the breakpoint defines a soft boundary. In such a case, for this particular block, the first region is:

2 3 2 –1 –1 1 1 1 –1 1 and the second region is:

0 1 2 0 0 1 –1 1 0 0 . . .

That is, for the second embodiment, the breakpoint of 7 corresponds to a boundary of 10 for this particular block.

The above discussion of breakpoints assumes a single breakpoint, and two regions in the ordering for those classes that include two regions.

More or fewer classes may be used, and some classes may include more than two regions, i.e., more than one breakpoint.

As another example, consider a method that includes classification into two classes as follows:

Class A: the ordered series of coefficients include coefficients of relatively large value, albeit with amplitude 1 being the most likely non-zero amplitude, amplitude 2 the next most likely amplitude, and so forth, with a breakpoint definable to divide the series into a low frequency region and a high frequency region, such that the non-zero-valued coefficients are clustered in the low frequency region and scattered in the high frequency region.

Class B: the non-zero-valued coefficients in the ordered series of coefficients are dominated by amplitude-1 coefficients, with a breakpoint definable to divide the series into a low frequency region and a high frequency region, such that the non-zero-valued coefficients are clustered in the low frequency region and scattered in the high frequency region.

On one embodiment that includes classes A and B, the following combinations of methods correspond to each class:

For a Class A blocks: the corresponding encoding method or combination of methods includes establishing a breakpoint along the path of the ordering of the coefficients to identify a first, e.g., low-frequency region and a second, e.g., high frequency region. The encoding of low frequency coefficients uses the clustered and large-value region method, and the encoding of the second, e.g., high-frequency region includes using the scattered region method.

For a class B block: the corresponding encoding method or combination of methods includes establishing a breakpoint along the path of the ordering of the coefficients to identify a first, e.g., low-frequency region and a second, e.g., high frequency region. The encoding of low frequency coefficients uses the clustered and small-value region method, and the encoding of the second, e.g., high-frequency region includes using the scattered and small-value region method.

In addition, a single overhead bit is used as an indication of the class of each block. In one embodiment, the one bit indication is used as a prefix before the encoded bits.

As yet another example, there may be more than two regions defined in one or more of the classes, one class may include a first, low frequency region where it is reasonably likely that there are runs of zero-valued coefficients and runs of non-zero-valued coefficients of value one or more, a second, mid-frequency region where it is reasonably likely that there are runs of zero-valued coefficients, and runs of coefficients of value one, but where there is not likely to be runs of coefficients greater than one, and a third high-frequency region where it is reasonably likely that there are runs of zero-valued coefficients, but not many runs of non-zero-valued coefficients. The corresponding coding process (method or combination of methods) for such a class includes using two breakpoints to define a first, second, and third region. In the first region, runs of non-zero-valued coefficients and runs of zero-valued coefficients are identified, and the runlengths of the non-zero amplitude and zero-amplitude coefficients are encoded using a first runlength coding method and a second runlength coding method. In the second region, runs of coefficients of amplitude-one, and runs of zero-valued coefficients are identified, and the runlengths of the amplitude-one and zero-amplitude coefficients are encoded using a third runlength coding method and a fourth runlength coding method, respectively. In the third region, runs of zero-valued coefficients are identified, and the runlengths of such zero-valued-runs are encoded using a fifth runlength coding method.

Apparatus

Figure 10:
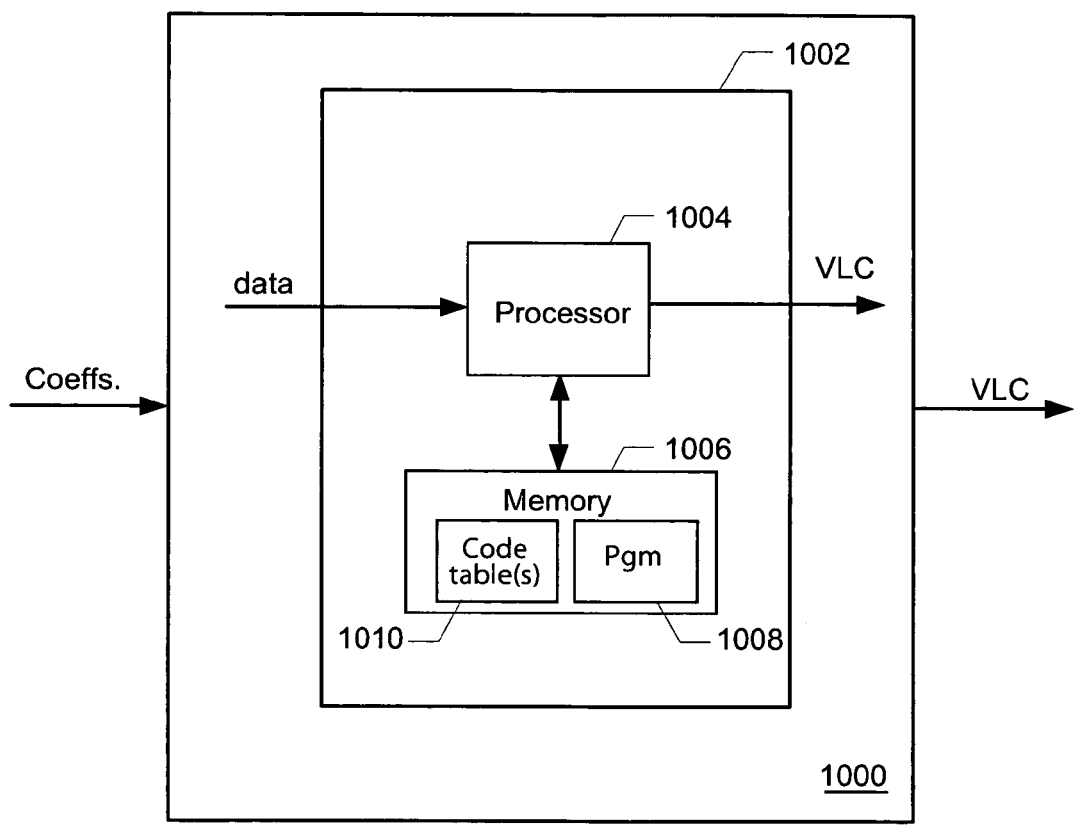
FIG. 10 shows an apparatus embodiment that includes a processing system with a processor and a memory implementing the coding methods described herein.

Another aspect of the invention is an apparatus for coding a series of digital signals, e.g., an ordered series of quantized coefficients of a transformed block of image data. FIG. 10 shows an apparatus 1000 that includes a processing system 1002 that includes one or more processors 1004 and a memory 1006. A single processor is shown in FIG. 10 and those in the art will appreciate that this may represent several processors. Similarly, a single memory subsystem 1006 is shown, and those in the art will appreciate that the memory subsystem may include different elements such as RAM, ROM, and so forth. In addition, the memory subsystem is meant to include any non-volatile memory storage such as a magnetic or optical storage component. A computer program 1008 is included and is loaded into the memory 1006. Note that at any time, some of the program may be in the different parts of the memory subsystem, as will be understood by those in the art. The program 1008 includes instructions to instruct the processor to implement, in different versions, the different coding methods described above. The processor thus accepts as data the ordered coefficients and generates the codewords. The apparatus 1000 further includes in the memory subsystem 1006 a coding data structure 1010 that provides the codewords for sets of one or more coefficients as described in any one of the novel coding methods described herein. In one embodiment, the data structure is in the form of one or more tables.

Note that FIG. 10 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 1006 in FIG. 10) that stores a coding data structure that provides the codewords for sets of one or more coefficients as described in any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

The invention is not limited to any particular set of classes or to any particular corresponding coding processes for classes. Only some examples of classes and corresponding coding processes have been described. It is anticipated that other new coding processes may be invented in the future, and that other coding processes already exist, and such other coding processes may be used in different embodiments of the invention.

One embodiment of each of the methods described herein is in the form of a computer program that executes on a processing system, e.g., one or more processors that are part of an image coder. Thus, as will be appreciated by those skilled in the art, embodiments of the present invention may be embodied as a method, an apparatus such as a special purpose apparatus, an apparatus such as a data processing system, or a carrier medium carrying computer readable code, e.g., a computer program product or a carrier wave. The carrier medium carries one or more computer readable code segments for instructing a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium or a carrier wave) carrying computer-readable program code segments embodied in or carried by the medium.

While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in some of the above examples for amplitude encoding, 127 possible non-zero values are assumed for the coefficients, the invention is not restricted to any number of possible quantization values.

Note also that while the embodiments above included separate sign bits ofr the sign, the sign can be incorporated into any of the amplitude coding methods.

Note also that the term amplitude is irrespective of sign. Therefore, for example, coefficient of values +1 and −1 both have amplitude 1.

In the embodiments described above, the forming of the codeword includes an indication of the sign of any non-zero-valued coefficients. In one version, the sign information for any runs of non-zero amplitudes in the first region is added together with the information of each amplitude. In an alternate embodiment, the sign information for any runs of non-zero amplitudes in the first region may be included in a different manner, e.g., as a code for the series of signs. Other alternate embodiments are also possible for encoding the sign.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the one or more amplitudes other than the most-likely-to-occur amplitude include a next-to-most-likely-to-occur amplitude, and wherein at least one of the classes has a corresponding method selected from the group of methods consisting of a first corresponding method, a second corresponding method, a third corresponding method, a fourth corresponding method, a fifth corresponding method, and a sixth corresponding method, the first corresponding method including:
identifying runs of digital signals having amplitude other than the most-likely-to-occur amplitude and runs of digital signals having the most-likely-to-occur amplitude;
encoding the lengths of the runs of digital signals having amplitude other than the most-likely-to-occur amplitude using a first runlength coding method that provides variable length codes for at least some of the runlengths;
encoding the amplitudes in the runs of digital signals having amplitude other than the most-likely-to-occur amplitude using a first amplitude coding method;
encoding the lengths of the runs of digital signals having amplitude other than the most-likely-to-occur amplitude using a second runlength coding method that provides variable length codes for at least some of the runlengths, the second corresponding method including:
identifying runs of digital signals having the next-to-most-likely-to-occur amplitude and runs of digital signals having the most-likely-to-occur amplitude;
identifying any digital signal not having the most likely-to-occur amplitude and not having the next-to-most-likely-to-occur amplitude, and encoding the amplitude of such digital signal not having the most likely-to-occur amplitude and not having the next-to-most-likely-to-occur amplitude using a second amplitude coding method; and
encoding the signs of the digital signals not having the most likely-to-occur amplitude and not having the next-to-most-likely-to-occur amplitude, the third corresponding method including:
identifying runs of digital signals having amplitude other than the most-likely-to-occur amplitude and runs of digital signals having the most-likely-to-occur amplitude, including identifying any digital signals not having the most likely-to-occur amplitude and not having the next-to-most-likely-to-occur amplitude;
encoding the existence of any digital signal not having the most likely-to-occur amplitude and not having the next-to-most-likely-to-occur amplitude in any run of digital signals having amplitude other than the most-likely-to-occur amplitude by an exception code, and further encoding amplitudes of digital signals not having the most likely-to-occur amplitude and not having the next-to-most-likely-to-occur amplitude using a third amplitude coding method; and
encoding the signs of digital signals not having the most likely-to-occur amplitude and not having the next-to-most-likely-to-occur amplitude, the fourth corresponding method including:
identifying events of a run of consecutive digital signals having the most-likely-to-occur amplitude followed by a single digital signal having other than the most-likely-to-occur amplitude, including events of a run of no digital signals having the most-likely-to-occur amplitude followed by a single digital signal having other than the most-likely-to-occur amplitude, the identifying including identifying events in which the ending digital signal has other than the most-likely-to-occur amplitude and other than the next-to-most-likely-to-occur amplitude;
for identified events in which the ending digital signal that has other than the most-likely-to-occur amplitude following the run of digital signals having the most-likely-to-occur amplitude has the next-to-most-likely-to-occur amplitude, encoding the events using a variable length runlength coding method that provides variable length codes for at least some of the identified events; and for identified events in which the digital signal having other than the most-likely-to-occur amplitude following the run of digital signals having the most-likely-to-occur amplitude has amplitude other than the next-to-most-likely-to-occur amplitude, encoding each event using the variable length runlength coding method and an exception code to identify the event as an exception and further encoding the amplitude of the digital signal not having the most-likely-to-occur amplitude or the next-to-most-likely-to-occur amplitude using a fourth amplitude coding method, the fifth corresponding method including:
  providing a breakpoint to defining a first contiguous region along the ordering of the series followed by a second continuous region, wherein the breakpoint defines a soft boundary between the first and second regions, such that in the case a sequence of consecutive digital signals all having an amplitude equal to the most-likely-to-occur amplitude, or all having amplitude other than most-likely-to-occur amplitude crosses the breakpoint, the boundary between the first and second region is at or after the end of the sequence such that the any identified event that starts in the first region is in the first region;
  encoding the digital signals of the first region using a first region encoding method; and
  encoding the digital signals in the second region using a second region encoding method,
  wherein the first region encoding method and the second region encoding method are such that the encoding of at least some of the digital signals in the first region is different than the encoding of at least some of the digital signals in the second region.

the sixth corresponding method including:
  providing a breakpoint to defining a first contiguous region along the ordering of the series followed by a second continuous region;
  encoding the digital signals of the first region using a first region encoding method; and
  encoding the digital signals in the second region using a second region encoding method,
  wherein the first region encoding method includes:
    identifying runs of digital signals having other than the most-likely-to-occur amplitude in the first region and runs of digital signals having the most-likely-to-occur amplitude in the first region;
    encoding the lengths of the runs of digital signals having other than the most-likely-to-occur amplitude in the first region using a first runlength coding method that provides variable length codes for at least some of the runlengths;
    encoding the amplitudes in the runs of digital signals having other than the most-likely-to-occur amplitude in the first region using a fifth amplitude coding method; and
    encoding the lengths of the runs of digital signals having other than the most-likely-to-occur amplitude in the first region using a second runlength coding method that provides variable length codes for at least some of the runlengths.
  wherein the second region coding method includes:
    identifying events of a run of consecutive digital signals having the most-likely-to-occur amplitude in the second region followed by a single digital signal having other than the most-likely-to-occur amplitude in the second region, including an event of a run of no digital signals having the most-likely-to-occur amplitude followed by a single digital signal having other than the most-likely-to-occur amplitude, the identifying including identifying events in which the ending digital signal having other than the most-likely-to-occur amplitude has an amplitude other than the next-to-most-likely-to-occur amplitude;
    for identified events in which the digital signal having other than the most-likely-to-occur amplitude following the run of digital signals having the most-likely-to-occur amplitude has the next-to-most-likely-to-occur amplitude, encoding the events using a fifth variable length runlength coding method;
    for identified events in which the digital signal following the run of digital signals having the most-likely-to-occur amplitude has amplitude other than the most-likely-to-occur amplitude and other than the next-to-most-likely-to-occur amplitude, encoding each event using the third variable length runlength coding method and an exception code to identify the event as an exception and further encoding the amplitude of the digital signal other than the most-likely-to-occur amplitude and other than the next-to-most-likely-to-occur amplitude using a sixth amplitude coding method; and
    encoding the sign of the digital signal having other than the most-likely-to-occur amplitude and other than the next-to-most-likely-to-occur amplitude that follows each identified run digital signals having the most-likely-to-occur amplitude in the second region, including the case of no preceding digital signals having the most-likely-to-occur amplitude.

2. A method as recited in claim 1, wherein the series of digital signals is a series of quantized coefficients of a transformed block of image data, the transform such that the most-likely-to-occur amplitude is 0, and the next most-likely-to-occur amplitude is 1.

3. A method as recited in claim 2, wherein the transformed block of image data includes a DC term, and wherein the DC term is separately encoded, such that the series of digital signals is a set of non-DC quantized coefficients of a transformed block of image data.

4. A method as recited in claim 2, wherein there are two classes for any type of image.

5. A method as recited in claim 2, wherein there are at least four classes for any type of image.

6. A method as recited in claim 2, wherein the plurality of classes depends on at least one of the group consisting of:
  whether the image block is an intraframe/still image block, or an interframe image block;
  whether the image block is a standard definition television image block or HDTV image block;
  whether the method is for high bit rate coding or relatively low bit rate coding; and
  whether the transform is a DCT or a non-DCT transform.

7. A method as recited in claim 2, wherein the classifying uses the series of coefficients.

8. A method as recited in claim 7, wherein the classifying includes determining the statistics of the coefficients according to at least one of the group of statistical criteria consisting of:
  whether or not there exists a breakpoint defining a first region where the non-zero coefficients are clustered and a second region where the non-zero-valued coefficients are mostly scattered;
  whether or not the non-zero-valued coefficients are mostly clustered or mostly scattered; and
  whether or not the non-zero-valued coefficients in a region or the whole block are almost all of amplitude 1.

9. A method as recited in claim 7, wherein the classifying selects the class according to which corresponding method produces the most compressed bitstream.

10. A method as recited in claim 9, wherein the classifying applying each of the corresponding coding processes sequentially and selecting the particular class according to the compression produced by the coding process corresponding to the particular class.

11. A method as recited in claim 9, wherein the classifying applying each of the corresponding coding processes in parallel and selecting the particular class according to the compression produced by the coding process corresponding to the particular class.

12. A method as recited in claim 2, wherein one of the classes has a corresponding method that includes:
   identifying runs of zero-valued coefficients that end in a non-zero coefficient, including a run of no zero-valued coefficients followed by a single non-zero-valued coefficient;
   encoding the lengths of the runs of the zero-valued coefficients using a runlength coding method that provides variable length codes for at least some of the runlengths; and
   for each identified run, encoding the amplitude of the non-zero valued coefficient according to an amplitude coding method.

13. A method as recited in claim 12, wherein the corresponding method further includes:
   encoding the signs of the non-zero-valued coefficients.

14. A method as recited in claim 12, wherein the encoding using the runlength coding method includes looking up a coding table.

15. A method as recited in claim 2, wherein a particular one of the classes has a corresponding method that includes:
   providing a breakpoint to defining a first contiguous region along the ordering of the series followed by a second continuous region;
   encoding the coefficients of the first region using a first region encoding method; and
   encoding the coefficients in the second region using a second region encoding method,
   wherein the first region encoding method and the second region encoding method are such that the encoding of at least some of the coefficients in the first region is different than the encoding of at least some of the coefficients in the second region.

16. A method as recited in claim 15, wherein the corresponding method of the particular class includes:
   providing at least one additional breakpoint such that the series is divided into more than two regions by the breakpoint and one additional breakpoint for each region in addition to the second region; and
   encoding the coefficients in each additional region defined by the corresponding additional breakpoint, the respective encoding in a region using a region coding method different from the coding methods used in other regions.

17. A method as recited in claim 15, wherein the breakpoint value is pre-selected.

18. A method as recited in claim 15, wherein the breakpoint value is selected from a finite set of pre-defined breakpoint values according to an image-dependent criterion.

19. A method as recited in claim 15, wherein the coding process corresponding to the particular class is applicable to intraframe image data and to interframe blocks of image data, and wherein a first pre-selected breakpoint value is used for intraframe image data and a second pre-selected breakpoint value is used for interframe image data.

20. A method as recited in claim 15, wherein the breakpoint defines a hard boundary between the first and second regions.

21. A method for processing, using hardware that may include one or more processors, the processing being of an ordered series of digital signals that each have a value including an amplitude from a finite set of amplitudes consisting of the most-likely-to-occur amplitude , and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
   classifying the series into a particular class of a plurality of classes according to the distribution of amplitudes of the digital signals, each class having a corresponding coding process of forming the codewords for the series;
   for the particular class of the series, applying the coding process corresponding to the class to form a set of codewords of the series; and
   adding an indication to the formed codewords to indicate the particular class,
such that relatively short codewords are formed to represent values or sequences of values that are relatively more likely to occur, and relatively long codewords are formed to represent values or sequences of values that are relatively less likely to occur,
wherein the series of digital signals is a series of quantized coefficients of a transformed block of image data, the transform such that the most-likely-to-occur amplitude is 0, and the next most-likely-to-occur amplitude is 1,
wherein there are at least four classes for any type of image, and
wherein the classes include:
   a first class of series wherein non-zero-valued coefficients along the ordering of the coefficients are of non-zero values, including a significant number that are not ±1, and wherein the non-zero valued coefficients are clustered throughout the ordering such that there is no clear breakpoint along the path of the ordering of the coefficients to identify a first region in which non-zero-valued coefficients are clustered and a second region in which the non-zero-valued coefficients are scattered;
   a second class of series wherein a significant number of non-zero-valued coefficients along the ordering of the coefficients are of non-zero-valued values, including a significant number that are not 1, and wherein there is a breakpoint along the path of the ordering of the coefficients to identify a first region in which the non-zero valued coefficients are substantially clustered and a second in which the non-zero valued coefficients are scattered;
   a third class of series wherein any non-zero-valued coefficients along the ordering of the coefficients are essentially dominated by coefficients that are ±1, and wherein there is a breakpoint along the path of the ordering of the coefficients to identify a first region in which these non-zero valued coefficients are substantially clustered and a second region in which these non-zero valued coefficients are scattered; and
   a fourth class of series wherein any non-zero-valued coefficients along the ordering of the coefficients are essentially dominated by coefficients that are ±1 and wherein the non-zero valued coefficients are scattered throughout the ordering such that there is no clear breakpoint along the path of the ordering of the coefficients to identify a first region in which non-zero-valued coefficients are clustered and a second region in which these non-zero valued coefficients are scattered.

22. A method for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding method that includes:

identifying runs of non-zero-valued coefficients and runs of zero-valued coefficients;

encoding the lengths of the runs of zero-valued coefficients using a first runlength coding method that provides variable length codes for at least some of the runlengths;

encoding the amplitudes in the runs of non-zero-valued coefficients using a first amplitude coding method; and encoding the lengths of the runs of non-zero-valued coefficients using a second runlength coding method that provides variable length codes for at least some of the runlengths.

23. A method as recited in claim 22, wherein the corresponding method further includes:

encoding the signs of the non-zero-valued coefficients.

24. A method as recited in claim 22, wherein the encoding using the first runlength coding method includes looking up a first coding table, and, wherein the encoding using the second runlength coding method includes looking up a second coding table.

25. A method as recited in claim 22, wherein the codewords for the coefficients start with a codeword of the first coding method and alternate between the first coding method and the second coding method, and wherein one of the codewords of the first coding method is a particular codeword to indicate that the first run encountered is a run of zeroes such that a codeword of the second method follows the particular codeword of the first method.

26. A method as recited in claim 22, wherein a second one of the classes has a second corresponding method that includes:

providing a breakpoint to defining a first contiguous region along the ordering of the series followed by a second continuous region;

encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region.

27. A method as recited in claim 26, wherein the second corresponding method includes:

providing at least one additional breakpoint such that the series is divided into more than two regions by the breakpoint and one additional breakpoint for each region in addition to the second region; and encoding the coefficients in each additional regions defined by the corresponding additional breakpoint, the respective encoding in a region using a region coding method different from the coding methods used in other regions.

28. A method as recited in claim 26, wherein the breakpoint value is pre-selected.

29. A method as recited in claim 26, wherein the breakpoint value is selected from a finite set of pre-defined breakpoint values according to an image-dependent criterion.

30. A method as recited in claim 26, wherein the second corresponding method is applicable to intraframe image data and to interframe blocks of image data, and wherein a first pre-selected breakpoint value is used for intraframe image data and a second first pre-selected breakpoint value is used for interframe image data.

31. A method as recited in claim 26, wherein the breakpoint defines a hard boundary between the first and second regions.

32. A method as recited in claim 26, wherein the breakpoint defines a soft boundary between the first and second regions, such that for a block having a sequence of consecutive non-zero values or consecutive zero values that crosses the breakpoint, the boundary between the first and second region is at the end of the sequence such that the whole sequence is in the first region.

33. A method as recited in claim 26, wherein the first region encoding method includes:

identifying runs of non-zero-valued coefficients in the first region and runs of zero-valued coefficients in the first region;

encoding the lengths of the runs of zero-valued coefficients in the first region using a third runlength coding method that provides variable length codes for at least some of the runlengths;

encoding the amplitudes in the runs of non-zero-valued coefficients in the first region using a second amplitude coding method; and encoding the lengths of the runs of non-zero-valued coefficients in the first region using a fourth runlength coding method that provides variable length codes for at least some of the runlengths.

34. A method as recited in claim 33, wherein the first region encoding method further includes:

encoding the signs of the non-zero-valued coefficients in the first region.

35. A method as recited in claim 33, wherein the encoding using the third runlength coding method includes looking up a first coding table, and, wherein the encoding using the second runlength coding method includes looking up a second coding table.

36. A method as recited in claim 33,
wherein the second region coding method includes:
  identifying runs of consecutive zero-valued coefficients in the second region that precede a non-zero-valued coefficient in the second region, including a run of no zero-valued coefficients preceding a non-zero-valued coefficient;
  encoding the runlengths of the identified runs of zero-valued coefficients using a fifth variable length runlength coding method;
  encoding the amplitudes of the non-zero-valued coefficient that follows each identified run of zero-valued-coefficients in the second region; and
  encoding the sign of the non-zero-valued coefficient that follows each identified run of zero-valued-coefficients in the second region.

37. A method as recited in claim 36, wherein the fifth coding method includes forming fixed length codewords for at least some of the runlengths in the second region.

38. A method as recited in claim 36, wherein the second region coding method includes:
  identifying events of a run of consecutive zero-valued coefficients in the second region followed by a single non-zero-valued coefficient in the second region, including an event of a run of no zero-valued coefficients followed by a single non-zero-valued coefficient, the identifying including identifying events in which the ending non-zero-valued coefficient has an amplitude other than 1;
  for identified events in which the non-zero-valued coefficient following the run of zero-valued coefficients has amplitude 1, encoding the events using a fifth variable length runlength coding method;
  for identified events in which the non-zero-valued coefficient following the run of zero-valued coefficients has amplitude other than 1, encoding each event using the fifth variable length runlength coding method and an exception code to identify the event as an exception and further encoding the amplitude of the non-amplitude-1 coefficient; and
  encoding the sign of the non-zero-valued coefficient that ends each identified event in the second region.

39. A method as recited in claim 38, wherein the fifth coding method includes forming fixed length codewords for at least some of the runlengths in the second region.

40. A method for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
  classifying the series into a particular class of a plurality of classes according to the distribution of amplitudes of the digital signals, each class having a corresponding coding process of forming the codewords for the series;
  for the particular class of the series, applying the coding process corresponding to the class to form a set of codewords of the series; and
  adding an indication to the formed codewords to indicate the particular class,
such that relatively short codewords are formed to represent values or sequences of values that are relatively more likely to occur, and relatively long codewords are formed to represent values or sequences of values that are relatively less likely to occur,
wherein the series of digital signals is a series of quantized coefficients of a transformed block of image data, the transform such that the most-likely-to-occur amplitude is 0, and the next most-likely-to-occur amplitude is 1, and
wherein one of the classes has a corresponding method that includes:
  identifying runs of amplitude-1 coefficients and runs of zero-valued coefficients;
  encoding the lengths of the runs of amplitude-1 coefficients using a first runlength coding method that provides variable length codes for at least some of the runlengths;
  encoding the signs of the amplitude-1 coefficients;
  identifying any non-zero-valued coefficient of amplitude other than one and encoding the amplitude's non-zero-valued non-amplitude-1 coefficient using an amplitude coding method;
  encoding the signs of the non-amplitude-1 non-zero-valued coefficients; and
  encoding the lengths of the runs of non-zero-valued coefficients using a second runlength coding method that provides variable length codes for at least some of the runlengths.

41. A method as recited in claim 40, wherein the encoding using the first runlength coding method includes looking up a first coding table, and, wherein the encoding using the second runlength coding method includes looking up a second coding table.

42. A method for processing for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
  classifying the series into a particular class of a plurality of classes according to the distribution of amplitudes of the digital signals, each class having a corresponding coding process of forming the codewords for the series;
  for the particular class of the series, applying the coding process corresponding to the class to form a set of codewords of the series; and
  adding an indication to the formed codewords to indicate the particular class,
such that relatively short codewords are formed to represent values or sequences of values that are relatively more likely to occur, and relatively long codewords are formed to represent values or sequences of values that are relatively less likely to occur,
wherein the series of digital signals is a series of quantized coefficients of a transformed block of image data, the transform such that the most-likely-to-occur amplitude is 0, and the next most-likely-to-occur amplitude is 1, and
wherein one of the classes has a corresponding method that includes:
  identifying runs of non-zero-valued coefficients and runs of zero-valued coefficients, including identifying any non-amplitude-1 non-zero-valued coefficients;

encoding the lengths of the runs of zero-valued coefficients using a first runlength coding method that provides variable length codes for at least some of the runlengths;

encoding the signs of the non-zero-valued coefficients;

encoding the existence of any non-amplitude-1 non-zero-valued coefficient in any run of non-zero-valued coefficients by an exception code, and further encoding amplitudes of non-zero-valued non-amplitude-1 coefficients using an amplitude coding method;

encoding the signs of the non-amplitude-1 non-zero-valued coefficients; and encoding the lengths of the runs of non-zero-valued coefficients using a second runlength coding method that provides variable length codes for at least some of the runlengths.

43. A method as recited in claim 42, wherein the encoding using the first runlength coding method includes looking up a first coding table, and, wherein the encoding using the second runlength coding method includes looking up a second coding table.

44. A method for processing for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding method that includes:

identifying events of a run of consecutive zero-valued coefficients followed by a single non-zero-valued coefficient, including events of a run of no zero-valued coefficients followed by a single non-zero-valued coefficient, the identifying including identifying events in which the ending non-zero-valued coefficient has an amplitude other than 1;

for identified events in which the non-zero-valued coefficient following the run of zero-valued coefficients has amplitude 1, encoding the events using a variable length runlength coding method that provides variable length codes for at least some of the events; and for identified events in which the non-zero-valued coefficient following the run of zero-valued coefficients has amplitude other than 1, encoding each event using the variable length runlength coding method and an exception code to identify the event as an exception and further encoding the amplitude of the non-amplitude-1 coefficient using an amplitude coding method.

45. A method as recited in claim 44, wherein the corresponding method further includes:

encoding the signs of the non-zero-valued coefficients.

46. A method as recited in claim 44, wherein the encoding using the runlength coding method includes looking up a coding table.

47. A method for processing for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein a particular one of the classes has a corresponding method that includes:

providing a breakpoint to defining a first contiguous region along the ordering of the series followed by a second continuous region;

encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region, wherein the breakpoint defines a soft boundary between the first and second regions, such that for a block having a sequence of consecutive non-zero values or consecutive zero values that crosses the breakpoint, the boundary between the first and second region is at or after the end of the sequence such that the whole sequence or any identified event that starts in the first region is in the first region.

48. A method as recited in claim 15, wherein the first region encoding method includes:

identifying runs of non-zero-valued coefficients in the first region and runs of zero-valued coefficients in the first region;

encoding the lengths of the runs of non-zero-valued coefficients in the first region using a first runlength coding method that provides variable length codes for at least some of the runlengths;
encoding the amplitudes in the runs of non-zero-valued coefficients in the first region using a first amplitude coding method; and
encoding the lengths of the runs of non-zero-valued coefficients in the first region using a second runlength coding method that provides variable length codes for at least some of the runlengths.

49. A method as recited in claim 48, wherein the first region encoding method further includes:
encoding the signs of the non-zero-valued coefficients in the first region.

50. A method as recited in claim 48, wherein the encoding using the first runlength coding method includes looking up a first coding table, and, wherein the encoding using the second runlength coding method includes looking up a second coding table.

51. A method as recited in claim 48, wherein the second region coding method includes:
identifying runs of consecutive zero-valued coefficients in the second region that precede a non-zero-valued coefficient in the second region, including a run of no zero-valued coefficients preceding a non-zero-valued coefficient;
encoding the runlengths of the identified runs of zero-valued coefficients using a third variable length runlength coding method;
encoding the amplitudes of the non-zero-valued coefficient that follows each identified run of zero-valued-coefficients in the second region; and
encoding the sign of the non-zero-valued coefficient that follows each identified run of zero-valued-coefficients in the second region.

52. A method as recited in claim 51, wherein the third coding method includes forming fixed length codewords for at least some of the runlengths in the second region.

53. A method for processing, using hardware that may include one or more processors, the processing being of an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
classifying the series into a particular class of a plurality of classes according to the distribution of amplitudes of the digital signals, each class having a corresponding coding process of forming the codewords for the series;
for the particular class of the series, applying the coding process corresponding to the class to form a set of codewords of the series; and
adding an indication to the formed codewords to indicate the particular class,
such that relatively short codewords are formed to represent values or sequences of values that are relatively more likely to occur, and relatively long codewords are formed to represent values or sequences of values that are relatively less likely to occur,
wherein the series of digital signals is a series of quantized coefficients of a transformed block of image data, the transform such that the most-likely-to-occur amplitude is 0, and the next most-likely-to-occur amplitude is 1, and
wherein a particular one of the classes has a corresponding method that includes:
providing a breakpoint to defining a first contiguous region along the ordering of the series followed by a second continuous region;
encoding the coefficients of the first region using a first region encoding method; and
encoding the coefficients in the second region using a second region encoding method,
wherein the first region encoding method and the second region encoding method are such that the encoding of at least some of the coefficients in the first region is different than the encoding of at least some of the coefficients in the second region,
wherein the first region encoding method includes:
identifying runs of non-zero-valued coefficients in the first region and runs of zero-valued coefficients in the first region;
encoding the lengths of the runs of non-zero-valued coefficients in the first region using a first runlength coding method that provides variable length codes for at least some of the runlengths;
encoding the amplitudes in the runs of non-zero-valued coefficients in the first region using a first amplitude coding method; and
encoding the lengths of the runs of non-zero-valued coefficients in the first region using a second runlength coding method that provides variable length codes for at least some of the runlengths, and
wherein the second region coding method includes:
identifying events of a run of consecutive zero-valued coefficients in the second region followed by a single non-zero-valued coefficient in the second region, including an event of a run of no zero-valued coefficients followed by a single non-zero-valued coefficient, the identifying including identifying events in which the ending non-zero-valued coefficient has an amplitude other than 1;
for identified events in which the non-zero-valued coefficient following the run of zero-valued coefficients has amplitude 1, encoding the events using a third variable length runlength coding method;
for identified events in which the non-zero-valued coefficient following the run of zero-valued coefficients has amplitude other than 1, encoding each event using the third variable length runlength coding method and an exception code to identify the event as an exception and further encoding the amplitude of the non-amplitude-1 coefficient using a second amplitude coding method; and
encoding the sign of the non-zero-valued coefficient that ends each identified event in the second region.

54. A method as recited in claim 53, wherein the third coding method includes forming fixed length codewords for at least some of the runlengths in the second region.

55. A, computer readable medium having a computer program coded thereon that when executed by one or more processors cause carrying out a method for processing an ordered series of digital signals that each have a value including an amplitude from a finite set of amplitudes consisting of the most-likely-to-occur amplitude and at least one other amplitude, the computer readable medium being a hardware storage medium, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the one or more amplitudes other than the most-likely-to-occur amplitude include a next-to-most-likely-to-occur amplitude, and wherein at least one of the classes has a corresponding method selected from the set of methods consisting of a first method, a second method, a third method, a fourth method, a fifth method, and a sixth method, the first method including:

identifying runs of digital signals having amplitude other than the most-likely-to-occur amplitude and runs of digital signals having the most-likely-to-occur amplitude;

encoding the lengths of the runs of digital signals having amplitude other than the most-likely-to-occur amplitude using a first runlength coding method that provides variable length codes for at least some of the runlengths;

encoding the amplitudes in the runs of digital signals having amplitude other than the most-likely-to-occur amplitude using a first amplitude coding method;

encoding the lengths of the runs of digital signals having amplitude other than the most-likely-to-occur amplitude using a second runlength coding method that provides variable length codes for at least some of the runlengths, the second method including:

identifying runs of digital signals having the next-to-most-likely-to-occur amplitude and runs of digital signals having the most-likely-to-occur amplitude;

identifying any digital signal not having the most likely-to-occur amplitude and not having the next-to-most-likely-to-occur amplitude, and encoding the amplitude of such digital signal not having the most likely-to-occur amplitude and not having the next-to-most-likely-to-occur amplitude using a second amplitude coding method; and encoding the signs of the digital signals not having the most likely-to-occur amplitude and not having the next-to-most-likely-to-occur amplitude, the third method including:

identifying runs of digital signals having amplitude other than the most-likely-to-occur amplitude and runs of digital signals having the most-likely-to-occur amplitude, including identifying any digital signals not having the most likely-to-occur amplitude and not having the next-to-most-likely-to-occur amplitude;

encoding the existence of any digital signal not having the most likely-to-occur amplitude and not having the next-to-most-likely-to-occur amplitude in any run of digital signals having amplitude other than the most-likely-to-occur amplitude by an exception code, and further encoding amplitudes of digital signals not having the most likely-to-occur amplitude and not having the next-to-most-likely-to-occur amplitude using a third amplitude coding method; and encoding the signs of digital signals not having the most likely-to-occur amplitude and not having the next-to-most-likely-to-occur amplitude, the fourth method including:

identifying events of a run of consecutive digital signals having the most-likely-to-occur amplitude followed by a single digital signal having other than the most-likely-to-occur amplitude, including events of a run of no digital signals having the most-likely-to-occur amplitude followed by a single digital signal having other than the most-likely-to-occur amplitude, the identifying including identifying events in which the ending digital signal has other than the most-likely-to-occur amplitude and other than the next-to-most-likely-to-occur amplitude;

for identified events in which the ending digital signal that has other than the most-likely-to-occur amplitude following the run of digital signals having the most-likely-to-occur amplitude has the next-to-most-likely-to-occur amplitude, encoding the events using a variable length runlength coding method that provides variable length codes for at least some of the identified events; and for identified events in which the digital signal having other than the most-likely-to-occur amplitude following the run of digital signals having the most-likely-to-occur amplitude has amplitude other than the next-to-most-likely-to-occur amplitude, encoding each event using the variable length runlength coding method and an exception code to identify the event as an exception and further encoding the amplitude of the digital signal not having the most-likely-to-occur amplitude or the next-to-most-likely-to-occur amplitude using a fourth amplitude coding method, the fifth method including:

providing a breakpoint to defining a first contiguous region along the ordering of the series followed by a second continuous region, wherein the breakpoint defines a soft boundary between the first and second regions, such that in the case a sequence of consecutive digital signals all having an amplitude equal the most-likely-to-occur amplitude, or all having amplitude other than most-likely-to-occur amplitude crosses the breakpoint, the boundary between the first and second region is at or after the end of the sequence such that the any identified event that starts in the first region is in the first region;

encoding the digital signals of the first region using a first region encoding method; and encoding the digital signals in the second region using a second region encoding method, wherein the first region encoding method and the second region encoding method are such that the encoding of at least some of the digital signals in the first region is different than the encoding of at least some of the digital signals in the second region.

the sixth method including:

providing a breakpoint to defining a first contiguous region along the ordering of the series followed by a second continuous region;

encoding the digital signals of the first region using a first region encoding method; and encoding the digital signals in the second region using a second region encoding method, wherein the first region encoding method includes:

identifying runs of digital signals having other than the most-likely-to-occur amplitude in the first region and runs of digital signals having the most-likely-to-occur amplitude in the first region;

encoding the lengths of the runs of digital signals having other than the most-likely-to-occur amplitude in the first region using a first runlength coding method that provides variable length codes for at least some of the runlengths;

encoding the amplitudes in the runs of digital signals having other than the most-likely-to-occur amplitude in the first region using a fifth amplitude coding method; and encoding the lengths of the runs of digital signals having other than the most-likely-to-occur amplitude in the first region using a second runlength coding method that provides variable length codes for at least some of the runlengths.

wherein the second region coding method includes:

identifying events of a run of consecutive digital signals having the most-likely-to-occur amplitude in the second region followed by a single digital signal having other than the most-likely-to-occur amplitude in the second region, including an event of a run of no digital signals having the most-likely-to-occur amplitude followed by a single digital signal having other than the most-likely-to-occur amplitude, the identifying including identifying events in which the ending digital signal having other than the most-likely-to-occur amplitude has an amplitude other than the next-to-most-likely-to-occur amplitude;

for identified events in which the digital signal having other than the most-likely-to-occur amplitude following the run of digital signals having the most-likely-to-occur amplitude has the next-to-most-likely-to-occur amplitude, encoding the events using a fifth variable length runlength coding method;

for identified events in which the digital signal following the run of digital signals having the most-likely-to-occur amplitude has amplitude other than the most-likely-to-occur amplitude and other than the next-to-most-likely-to-occur amplitude, encoding each event using the third variable length runlength coding method and an exception code to identify the event as an exception and further encoding the amplitude of the digital signal other than the most-likely-to-occur amplitude and other than the next-to-most-likely-to-occur amplitude using a sixth amplitude coding method; and encoding the sign of the digital signal having other than the most-likely-to-occur amplitude and other than the next-to-most-likely-to-occur amplitude that follows each identified run digital signals having the most-likely-to-occur amplitude in the second region, including the case of no preceding digital signals having the most-likely-to-occur amplitude.

56. A computer readable medium as recited in claim 55, wherein the series of digital signals is a series of quantized coefficients of a transformed block of image data, the transform such that the most-likely-to-occur amplitude is 0, and the next most-likely-to-occur amplitude is 1.

57. A computer readable medium as recited in claim 56, wherein the transformed block of image data includes a DC term, and wherein the DC term is separately encoded, such that the series of digital signals is a set of non-DC quantized coefficients of a transformed block of image data.

58. A computer readable medium as recited in claim 56, wherein there are two classes for any type of image.

59. A computer readable medium as recited in claim 56, wherein there are at least four classes for any type of image.

60. A computer readable medium as recited in claim 56, wherein the classifying uses the series of coefficients.

61. A computer readable medium as recited in claim 60, wherein the classifying selects the class according to which corresponding coding process produces the most compressed bitstream.

62. A computer readable medium as recited in claim 56, wherein one of the classes has a corresponding coding process that includes:

identifying runs of zero-valued coefficients that end in a non-zero coefficient, including a run of no zero-valued coefficients followed by a single non-zero-valued coefficient;

encoding the lengths of the runs of the zero-valued coefficients using a runlength coding method that provides variable length codes for at least some of the runlengths;

encoding the signs of the non-zero-valued coefficients; and for each identified run, encoding the amplitude of the non-zero valued coefficient according to an amplitude coding method.

63. A computer readable medium as recited in claim 56, wherein a particular one of the classes has a corresponding coding process that includes:

providing a breakpoint to defining a first contiguous region along the ordering of the series followed by a second continuous region, encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region.

64. A computer readable medium as recited in claim 63, wherein the breakpoint value is pre-selected.

65. A computer readable medium as recited in claim 63, wherein the breakpoint defines a hard boundary between the first and second regions.

66. A computer readable medium having a computer program coded thereon that when executed by one or more processors cause carrying out a method for processing an ordered series of digital signals that each have a value including an amplitude from a finite set of amplitudes consisting of the most-likely-to-occur amplitude and at least one other amplitude, the computer readable medium being a hardware storage medium, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:

classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding coding process that includes:
- identifying runs of non-zero-valued coefficients and runs of zero-valued coefficients;
- encoding the lengths of the runs of zero-valued coefficients using a first runlength coding method that provides variable length codes for at least some of the runlengths;
- encoding the amplitudes in the runs of non-zero-valued coefficients using a first amplitude coding method;
- encoding the signs of the non-zero-valued coefficients; and
- encoding the lengths of the runs of non-zero-valued coefficients using a second runlength coding method that provides variable length codes for at least some of the runlengths.

67. A computer readable medium as recited in claim 66, wherein a second one of the classes has a second corresponding coding process that includes:
- providing a breakpoint to defining a first contiguous region along the ordering of the series followed by a second continuous region,
- encoding the coefficients of the first region using a first region encoding method; and
- encoding the coefficients in the second region using a second region encoding method, wherein the first region encoding method and the second region encoding method are such that the encoding of at least some of the coefficients in the first region is different than the encoding of at least some of the coefficients in the second region.

68. A computer readable medium as recited in claim 67, wherein the breakpoint defines a hard boundary between the first and second regions.

69. A computer readable medium as recited in claim 67, wherein the breakpoint defines a soft boundary between the first and second regions, such that for a block having a sequence of consecutive non-zero values or consecutive zero values that crosses the breakpoint, the boundary between the first and second region is at the end of the sequence such that the whole sequence is in the first region.

70. A computer readable medium as recited in claim 67, wherein the first region encoding method includes:
- identifying runs of non-zero-valued coefficients in the first region and runs of zero-valued coefficients in the first region;
- encoding the lengths of the runs of zero-valued coefficients in the first region using a third runlength coding method that provides variable length codes for at least some of the runlengths;
- encoding the amplitudes in the runs of non-zero-valued coefficients in the first region using a second amplitude coding method;
- encoding the signs of the non-zero-valued coefficients in the first region; and
- encoding the lengths of the runs of non-zero-valued coefficients in the first region using a fourth runlength coding method that provides variable length codes for at least some of the runlengths.

71. A computer readable medium having a computer program coded thereon that when executed by one or more processors cause carrying out a method for processing an ordered series of digital signals that each have a value including an amplitude from a finite set of amplitudes consisting of the most-likely-to-occur amplitude and at least one other amplitude, the computer readable medium being a hardware storage medium, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
- classifying the series into a particular class of a plurality of classes according to the distribution of amplitudes of the digital signals, each class having a corresponding coding process of forming the codewords for the series;
- for the particular class of the series, applying the coding process corresponding to the class to form a set of codewords of the series; and
- adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding coding process that includes:
- identifying events of a run of consecutive zero-valued coefficients followed by a single non-zero-valued coefficient, including events of a run of no zero-valued coefficients followed by a single non-zero-valued coefficient, the identifying including identifying events in which the ending non-zero-valued coefficient has an amplitude other than 1;
- for identified events in which the non-zero-valued coefficient following the run of zero-valued coefficients has amplitude 1, encoding the events using a variable length runlength coding method that provides variable length codes for at least some of the events;
- for identified events in which the non-zero-valued coefficient following the run of zero-valued coefficients has amplitude other than 1, encoding each event using the variable length runlength coding method and an exception code to identify the event as an exception and further encoding the amplitude of the non-amplitude-1 coefficient using an amplitude coding method; and encoding the signs of the non-zero-valued non-amplitude-1 coefficients.

72. A computer readable medium having a computer program coded thereon that when executed by one or more processors cause carrying out a method for processing an ordered series of digital signals that each have a value including an amplitude from a finite set of amplitudes consisting of the most-likely-to-occur amplitude and at least one other amplitude, the computer readable medium being a hardware storage medium, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method comprising:
- classifying the series into a particular class of a plurality of classes according to the distribution of amplitudes of the digital signals, each class having a corresponding coding process of forming the codewords for the series;

for the particular class of the series, applying the coding process corresponding to the class to form a set of codewords of the series; and adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, wherein a particular one of the classes has a corresponding coding process that includes:

providing a breakpoint to defining a first contiguous region along the ordering of the series followed by a second continuous region, encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region, and wherein the breakpoint defines a soft boundary between the first and second regions, such that for a block having a sequence of consecutive non-zero values or consecutive zero values that crosses the breakpoint, the boundary between the first and second region is at or after the end of the sequence such that the whole sequence or any event that starts in the first region is in the first region.

73. An apparatus for processing an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the apparatus comprising:

means for classifying the series into a particular class of a plurality of classes according to the distribution of amplitudes of the digital signals, each class having a corresponding coding process of forming the codewords for the series;

means for applying, for the particular class of the series, the coding process corresponding to the particular class to form a set of codewords of the series; and means for adding an indication to the formed codewords to indicate the particular class, such that relatively short codewords are formed to represent values or sequences of values that are relatively more likely to occur, and relatively long codewords are formed to represent values or sequences of values that are relatively less likely to occur.

wherein the one or more amplitudes other than the most-likely-to-occur amplitude include a next-to-most-likely-to-occur amplitude, and wherein at least one of the classes has a corresponding method selected from the group of methods consisting of a first corresponding method, a second corresponding method, a third corresponding method, a fourth corresponding method, a fifth corresponding method, and a sixth corresponding method, the first corresponding method including:

identifying runs of digital signals having amplitude other than the most-likely-to-occur amplitude and runs of digital signals having the most-likely-to-occur amplitude;

encoding the lengths of the runs of digital signals having amplitude other than the most-likely-to-occur amplitude using a first runlength coding method that provides variable length codes for at least some of the runlengths;

encoding the amplitudes in the runs of digital signals having amplitude other than the most-likely-to-occur amplitude using a first amplitude coding method;

encoding the lengths of the runs of digital signals having amplitude other than the most-likely-to-occur amplitude using a second runlength coding method that provides variable length codes for at least some of the runlengths, the second corresponding method including:

identifying runs of digital signals having the next-to-most-likely-to-occur amplitude and runs of digital signals having the most-likely-to-occur amplitude;

identifying any digital signal not having the most likely-to-occur amplitude and not having the next-to-most-likely-to-occur amplitude, and encoding the amplitude of such digital signal not having the most likely-to-occur amplitude and not having the next-to-most-likely-to-occur amplitude using a second amplitude coding method; and encoding the signs of the digital signals not having the most likely-to-occur amplitude and not having the next-to-most-likely-to-occur amplitude, the third corresponding method including:

identifying runs of digital signals having amplitude other than the most-likely-to-occur amplitude and runs of digital signals having the most-likely-to-occur amplitude, including identifying any digital signals not having the most likely-to-occur amplitude and not having the next-to-most-likely-to-occur amplitude;

encoding the existence of any digital signal not having the most likely-to-occur amplitude and not having the next-to-most-likely-to-occur amplitude in any run of digital signals having amplitude other than the most-likely-to-occur amplitude by an exception code, and further encoding amplitudes of digital signals not having the most likely-to-occur amplitude and not having the next-to-most-likely-to-occur amplitude using a third amplitude coding method; and encoding the signs of digital signals not having the most likely-to-occur amplitude and not having the next-to-most-likely-to-occur amplitude, the fourth corresponding method including:

identifying events of a run of consecutive digital signals having the most-likely-to-occur amplitude followed by a single digital signal having other than the most-likely-to-occur amplitude, including events of a run of no digital signals having the most-likely-to-occur amplitude followed by a single digital signal having other than the most-likely-to-occur occur amplitude, the identifying including identifying events in which the ending digital signal has other than the most-likely-to-occur amplitude and other than the next-to-most-likely-to-occur amplitude;

for identified events in which the ending digital signal that has other than the most-likely-to-occur amplitude following the run of digital signals having the most-likely-to-occur amplitude has the next-to-most-likely-to-occur likely-to-occur amplitude, encoding the events using a variable length runlength coding method that provides variable length codes for at least some of the identified events; and for identified events in which the digital signal having other than the most-likely-to-occur amplitude following the run of digital signals having the most-likely-to-occur amplitude has amplitude other than the next-to-most-likely-to-occur amplitude, encoding each event using the variable length runlength coding method and an exception code to identify the event as an exception and further encoding the amplitude of the digital signal not having the most-likely-to-occur amplitude or the next-to-most-likely-to-occur amplitude using a fourth amplitude coding method, the fifth corresponding method including:
providing a breakpoint to defining a first contiguous region along the ordering of the series followed by a second continuous region, wherein the breakpoint defines a soft boundary between the first and second regions, such that in the case a sequence of consecutive digital signals all having an amplitude equal to the most-likely-to-occur amplitude, or all having amplitude other than most-likely-to-occur amplitude crosses the breakpoint, the boundary between the first and second region is at or after the end of the sequence such that the any identified event that starts in the first region is in the first region;

encoding the digital signals of the first region using a first region encoding method; and encoding the digital signals in the second region using a second region encoding method, wherein the first region encoding method and the second region encoding method are such that the encoding of at least some of the digital signals in the first region is different than the encoding of at least some of the digital signals in the second region.

the sixth corresponding method including:
providing a breakpoint to defining a first contiguous region along the ordering of the series followed by a second continuous region;

encoding the digital signals of the first region using a first region encoding method; and encoding the digital signals in the second region using a second region encoding method, wherein the first region encoding method includes:
identifying runs of digital signals having other than the most-likely-to-occur amplitude in the first region and runs of digital signals having the most-likely-to-occur amplitude in the first region;

encoding the lengths of the runs of digital signals having other than the most-likely-to-occur amplitude in the first region using a first runlength coding method that provides variable length codes for at least some of the runlengths;

encoding the amplitudes in the runs of digital signals having other than the most-likely-to-occur amplitude in the first region using a fifth amplitude coding method; and encoding the lengths of the runs of digital signals having other than the most-likely-to-occur amplitude in the first region using a second runlength coding method that provides variable length codes for at least some of the runlengths.

wherein the second region coding method includes:
identifying events of a run of consecutive digital signals having the most-likely-to-occur amplitude in the second region followed by a single digital signal having other than the most-likely-to-occur amplitude in the second region, including an event of a run of no digital signals having the most-likely-to-occur amplitude followed by a single digital signal having other than the most-likely-to-occur amplitude, the identifying including identifying events in which the ending digital signal having other than the most-likely-to-occur amplitude has an amplitude other than the next-to-most-likely-to-occur amplitude;

for identified events in which the digital signal having other than the most-likely-to-occur amplitude following the run of digital signals having the most-likely-to-occur amplitude has the next-to-most-likely-to-occur amplitude, encoding the events using a fifth variable length runlength coding method;

for identified events in which the digital signal following the run of digital signals having the most-likely-to-occur amplitude has amplitude other than the most-likely-to-occur amplitude and other than the next-to-most-likely-to-occur amplitude, encoding each event using the third variable length runlength coding method and an exception code to identify the event as an exception and further encoding the amplitude of the digital signal other than the most-likely-to-occur amplitude and other than the next-to-most-likely-to-occur amplitude using a sixth amplitude coding method; and encoding the sign of the digital signal having other than the most-likely-to-occur amplitude and other than the next-to-most-likely-to-occur amplitude that follows each identified run digital signals having the most-likely-to-occur amplitude in the second region, including the case of no preceding digital signals having the most-likely-to-occur amplitude.

74. An apparatus as recited in claim 73, wherein the series of digital signals is a series of quantized coefficients of a transformed block of image data, the transform such that the most-likely-to-occur amplitude is 0, and the next most-likely-to-occur amplitude is 1.

75. An apparatus as recited in claim 74, wherein the transformed block of image data includes a DC term, and wherein the DC term is separately encoded, such that the series of digital signals is a set of non-DC quantized coefficients of a transformed block of image data.

76. An apparatus as recited in claim 74, wherein there are two classes for any type of image.

77. An apparatus as recited in claim 74, wherein there are at least four classes for any type of image.

78. An apparatus as recited in claim 74, wherein the means for classifying uses the series of coefficients.

79. An apparatus as recited in claim 78, wherein the means for classifying selects the class according to which corresponding coding processes produce the most compressed bitstream.

80. An apparatus as recited in claim 74, wherein one of the classes has a corresponding coding process that includes:
identifying runs of zero-valued coefficients that end in a non-zero coefficient, including a run of no zero-valued coefficients followed by a single non-zero-valued coefficient;

encoding the lengths of the runs of the zero-valued coefficients using a runlength coding method that provides variable length codes for at least some of the runlengths;

encoding the signs of the non-zero-valued coefficients; and for each identified run, encoding the amplitude of the non-zero valued coefficient according to an amplitude coding method.

81. An apparatus for processing an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the apparatus comprising:

means for classifying the series into a particular class of a plurality of classes according to the distribution of amplitudes of the digital signals, each class having a corresponding coding process of forming the codewords for the series;

means for applying, for the particular class of the series, the coding process corresponding to the particular class to form a set of codewords of the series; and means for adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding coding process that includes:

identifying events of a run of consecutive zero-valued coefficients followed by a single non-zero-valued coefficient, including events of a run of no zero-valued coefficients followed by a single non-zero-valued coefficient, the identifying including identifying events in which the ending non-zero-valued coefficient has an amplitude other than 1;

for identified events in which the non-zero-valued coefficient following the run of zero-valued coefficients has amplitude 1, encoding the events using a variable length runlength coding method that provides variable length codes for at least some of the events;

for identified events in which the non-zero-valued coefficient following the run of zero-valued coefficients has amplitude other than 1, encoding each event using the variable length runlength coding method and an exception code to identify the event as an exception and further encoding the amplitude of the non-amplitude-1 coefficient using an amplitude coding method; and encoding the signs of the non-zero-valued non-amplitude-1 coefficients.

82. An apparatus as recited in claim 74, wherein a particular one of the classes has a corresponding coding process that includes:

providing a breakpoint to define a first contiguous region along the ordering of the series followed by a second continuous region;

encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region.

83. An apparatus as recited in claim 82, wherein the breakpoint value is pre-selected.

84. An apparatus as recited in claim 82, wherein the breakpoint defines a hard boundary between the first and second regions.

85. An apparatus for processing an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the apparatus comprising:

means for classifying the series into a particular class of a plurality of classes according to the distribution of amplitudes of the digital signals, each class having a corresponding coding process of forming the codewords for the series;

means for applying, for the particular class of the series, the coding process corresponding to the particular class to form a set of codewords of the series; and means for adding an indication to the formed codewords to indicate the particular class, such that relatively short codewords are formed to represent values or sequences of values that are relatively more likely to occur, and relatively long codewords are formed to represent values or sequences of values that are relatively less likely to occur, wherein the series of digital signals is a series of quantized coefficients of a transformed block of image data, the transform such that the most-likely-to-occur amplitude is 0, and the next most-likely-to-occur amplitude is 1, and wherein one of the classes has a corresponding coding process that includes:

identifying runs of non-zero-valued coefficients and runs of zero-valued coefficients;

encoding the lengths of the runs of zero-valued coefficients using a first runlength coding method that provides variable length codes for at least some of the runlengths;

encoding the amplitudes in the runs of non-zero-valued coefficients using a first amplitude coding method;

encoding the signs of the non-zero-valued coefficients; and encoding the lengths of the runs of non-zero-valued coefficients using a second runlength coding method that provides variable length codes for at least some of the runlengths.

86. An apparatus as recited in claim 85, wherein a second one of the classes has a second corresponding coding process that includes:

providing a breakpoint to defineing a first contiguous region along the ordering of the series followed by a second continuous region, encoding the coefficients of the first region using a first region encoding method; and encoding the coefficients in the second region using a second region encoding method, wherein the first region encoding method and the second region encoding method are such that the encoding of at least some of the coefficients in the first region is different than the encoding of at least some of the coefficients in the second region.

87. An apparatus as recited in claim 86, wherein the breakpoint defines a hard boundary between the first and second regions.

88. An apparatus as recited in claim 86, wherein the breakpoint defines a soft boundary between the first and second regions, such that for a block having a sequence of consecutive non-zero values or consecutive zero values that crosses the breakpoint, the boundary between the first and second region is at the end of the sequence such that the whole sequence is in the first region.

89. An apparatus as recited in claim 86, wherein the first region encoding method includes:
identifying runs of non-zero-valued coefficients in the first region and runs of zero-valued coefficients in the first region;
encoding the lengths of the runs of zero-valued coefficients in the first region using a third runlength coding method that provides variable length codes for at least some of the runlengths;
encoding the amplitudes in the runs of non-zero-valued coefficients in the first region using a second amplitude coding method;
encoding the signs of the non-zero-valued coefficients in the first region; and
encoding the lengths of the runs of non-zero-valued coefficients in the first region using a fourth runlength coding method that provides variable length codes for at least some of the runlengths.

90. An apparatus for processing an ordered series of digital signals that each have a value including an amplitude from a finite set of amplitudes consisting of the most-likely-to-occur amplitude and at least one other amplitude, the processing to reduce the amount of data used to represent the digital signals and to form codewords such that the more likely to occur values or sequences of values of digital signals are represented by relatively short codewords and the less likely to occur values or sequences of values of digital signals are represented by relatively long codewords, the apparatus comprising:
means for classifying the series into a particular class of a plurality of classes according to the distribution of amplitudes of the digital signals, each class having a corresponding coding process of forming the codewords for the series;
means for applying, for the particular class of the series, the coding process corresponding to the particular class to form a set of codewords of the series; and
means for adding an indication to the formed codewords to indicate the particular class,
such that relatively short codewords are formed to represent values or sequences of values that are relatively more likely to occur, and relatively long codewords are formed to represent values or sequences of values that are relatively less likely to occur,
wherein the series of digital signals is a series of quantized coefficients of a transformed block of image data, the transform such that the most-likely-to-occur amplitude is 0, and the next most-likely-to-occur amplitude is 1,
wherein a particular one of the classes has a corresponding coding process that includes:
providing a breakpoint to define a first contiguous region along the ordering of the series followed by a second continuous region; encoding the coefficients of the first region using a first region encoding method; and
encoding the coefficients in the second region using a second region encoding method,
wherein the first region encoding method and the second region encoding method are such that the encoding of at least some of the coefficients in the first region is different than the encoding of at least some of the coefficients in the second region, and
wherein the breakpoint defines a soft boundary between the first and second regions, such that for a block having a sequence of consecutive non-zero values or consecutive zero values that crosses the breakpoint, the boundary between the first and second region is at or after the end of the sequence such that the whole sequence or any event that starts in the first region is in the first region.

91. An apparatus including a processing system, the apparatus to accept an ordered series of digital signals that each have a value including an amplitude from a finite set of amplitudes consisting of the most-likely-to-occur amplitude and at least one other amplitude, the apparatus to perform a method for processing the ordered series to reduce the amount of data used to represent the digital signals and to form codewords such that the more likely to occur values or sequences of values of digital signals are represented by relatively short codewords and the less likely to occur values or sequences of values of digital signals are represented by relatively long codewords, the method for processing comprising:
classifying the series into a particular class of a plurality of classes according to the distribution of amplitudes of the digital signals, each class having a corresponding coding process of forming the codewords for the series;
for the particular class of the series, applying the coding process corresponding to the class to form a set of codewords of the series; and
adding an indication to the formed codewords to indicate the particular class, such that relatively short codewords are formed to represent values or sequences of values that are relatively more likely to occur, and relatively long codewords are formed to represent values or sequences of values that are relatively less likely to occur,
wherein the one or more amplitudes other than the most-likely-to-occur amplitude include a next-to-most-likely-to-occur amplitude, and wherein at least one of the classes has a corresponding method selected from the group of methods consisting of a first corresponding method, a second corresponding method, a third corresponding method, a fourth corresponding method, a fifth corresponding method, and a sixth corresponding method,
the first corresponding method including:
identifying runs of digital signals having amplitude other than the most-likely-to-occur amplitude and runs of digital signals having the most-likely-to-occur amplitude;
encoding the lengths of the runs of digital signals having amplitude other than the most-likely-to-occur amplitude using a first runlength coding method that provides variable length codes for at least some of the runlengths;
encoding the amplitudes in the runs of digital signals having amplitude other than the most-likely-to-occur amplitude using a first amplitude coding method;
encoding the lengths of the runs of digital signals having amplitude other than the most-likely-to-occur amplitude using a second runlength coding method that provides variable length codes for at least some of the runlengths,
the second corresponding method including:
identifying runs of digital signals having the next-to-most-likely-to-occur amplitude and runs of digital signals having the most-likely-to-occur amplitude;
identifying any digital signal not having the most likely-to-occur amplitude and not having the next-to-most-likely-to-occur amplitude, and encoding the amplitude of such digital signal not having the most likely-to-occur amplitude and not having the next-to-most-likely-to-occur amplitude using a second amplitude coding method; and encoding the signs of the digital signals not having the most likely-to-occur amplitude and not having the next-to-most-likely-to-occur amplitude, the third corresponding method including:

identifying runs of digital signals having amplitude other than the most-likely-to-occur amplitude and runs of digital signals having the most-likely-to-occur amplitude, including identifying any digital signals not having the most likely-to-occur amplitude and not having the next-to-most-likely-to-occur amplitude;

encoding the existence of any digital signal not having the most likely-to-occur amplitude and not having the next-to-most-likely-to-occur amplitude in any run of digital signals having amplitude other than the most-likely-to-occur amplitude by an exception code, and farther encoding amplitudes of digital signals not having the most likely-to-occur amplitude and not having the next-to-most-likely-to-occur amplitude using a third amplitude coding method; and encoding the signs of digital signals not having the most likely-to-occur amplitude and not having the next-to-most-likely-to-occur amplitude, the fourth corresponding method including:

identifying events of a run of consecutive digital signals having the most-likely-to-occur amplitude followed by a single digital signal having other than the most-likely-to-occur amplitude, including events of a run of no digital signals having the most-likely-to-occur amplitude followed by a single digital signal having other than the most-likely-to-occur amplitude, the identifying including identifying events in which the ending digital signal has other than the most-likely-to-occur amplitude and other than the next-to-most-likely-to-occur amplitude;

for identified events in which the ending digital signal that has other than the most-likely-to-occur amplitude following the run of digital signals having the most-likely-to-occur amplitude has the next-to-most-likely-to-occur amplitude, encoding the events using a variable length runlength coding method that provides variable length codes for at least some of the identified events; and for identified events in which the digital signal having other than the most-likely-to-occur amplitude following the run of digital signals having the most-likely-to-occur amplitude has amplitude other than the next-to-most-likely-to-occur amplitude, encoding each event using the variable length runlength coding method and an exception code to identify the event as an exception and farther encoding the amplitude of the digital signal not having the most-likely-to-occur amplitude or the next-to-most-likely-to-occur amplitude using a fourth amplitude coding method, the fifth corresponding method including: providing a breakpoint to defining a first contiguous region along the ordering of the series followed by a second continuous region, wherein the breakpoint defines a soft boundary between the first and second regions, such that in the case a sequence of consecutive digital signals all having an amplitude equal to the most-likely-to-occur amplitude, or all having amplitude other than most-likely-to-occur amplitude crosses the breakpoint, the boundary between the first and second region is at or after the end of the sequence such that the any identified event that staffs in the first region is in the first region;

encoding the digital signals of the first region using a first region encoding method; and encoding the digital signals in the second region using a second region encoding method, wherein the first region encoding method and the second region encoding method are such that the encoding of at least some of the digital signals in the first region is different than the encoding of at least some of the digital signals in the second region.

the sixth corresponding method including:

providing a breakpoint to defining a first contiguous region along the ordering of the series followed by a second continuous region;

encoding the digital signals of the first region using a first region encoding method; and encoding the digital signals in the second region using a second region encoding method, wherein the first region encoding method includes:

identifying runs of digital signals having other than the most-likely-to-occur amplitude in the first region and runs of digital signals having the most-likely-to-occur amplitude in the first region;

encoding the lengths of the runs of digital signals having other than the most-likely-to-occur amplitude in the first region using a first runlength coding method that provides variable length codes for at least some of the runlengths;

encoding the amplitudes in the runs of digital signals having other than the most-likely-to-occur amplitude in the first region using a fifth amplitude coding method; and encoding the lengths of the runs of digital signals having other than the most-likely-to-occur amplitude in the first region using a second runlength coding method that provides variable length codes for at least some of the runlengths.

wherein the second region coding method includes:

identifying events of a run of consecutive digital signals having the most-likely-to-occur amplitude in the second region followed by a single digital signal having other than the most-likely-to-occur amplitude in the second region, including an event of a run of no digital signals having the most-likely-to-occur amplitude followed by a single digital signal having other than the most-likely-to-occur amplitude, the identifying including identifying events in which the ending digital signal having other than the most-likely-to-occur amplitude has an amplitude other than the next-to-most-likely-to-occur amplitude;

for identified events in which the digital signal having other than the most-likely-to-occur amplitude following the run of digital signals having the most-likely-to-occur amplitude has the next-to-most-likely-to-occur occur amplitude, encoding the events using a fifth variable length runlength coding method;

for identified events in which the digital signal following the run of digital signals having the most-likely-to-occur amplitude has amplitude other than the most-likely-to-occur amplitude and other than the next-to-most-likely-to-occur amplitude, encoding each event using the third variable length runlength coding method and an exception code to identify the event as an exception and further encoding the amplitude of the digital signal other than the most-likely-to-occur amplitude and other than the next-to-most-likely-to-occur amplitude using a sixth amplitude coding method; and encoding the sign of the digital signal having other than the most-likely-to-occur amplitude and other than the next-to-most-likely-to-occur amplitude that follows each identified run digital signals having the most-likely-tooccur amplitude in the second region, including the case of no preceding digital signals having the most-likely-to-occur amplitude.

92. An apparatus as recited in claim 91, wherein the series of digital signals is a series of quantized coefficients of a transformed block of image data, the transform such that the most-likely-to-occur amplitude is 0, and the next most-likely-to-occur amplitude is 1.

93. An apparatus as recited in claim 92, wherein the transformed block of image data includes a DC term, and wherein the DC term is separately encoded, such that the series of digital signals is a set of non-DC quantized coefficients of a transformed block of image data.

94. An apparatus as recited in claim 92, wherein the classifying uses the series of coefficients.

95. An apparatus as recited in claim 94, wherein the classifying selects the class according to which corresponding coding process produces the most compressed bitstream.

* * * * *